United States Patent
Fujimori et al.

(10) Patent No.: US 11,922,038 B2
(45) Date of Patent: Mar. 5, 2024

(54) MEMORY SYSTEM

(71) Applicant: KIOXIA CORPORATION, Tokyo (JP)

(72) Inventors: Takumi Fujimori, Yamato Kanagawa (JP); Tetsuya Sunata, Yokohama Kanagawa (JP)

(73) Assignee: Kioxia Corporation, Tokyo (JP)

(*) Notice: Subject to any disclaimer, the term of this patent is extended or adjusted under 35 U.S.C. 154(b) by 7 days.

(21) Appl. No.: 17/897,071

(22) Filed: Aug. 26, 2022

(65) Prior Publication Data

US 2023/0244397 A1 Aug. 3, 2023

(30) Foreign Application Priority Data

Feb. 1, 2022 (JP) ................. 2022-014123

(51) Int. Cl.
*G06F 3/06* (2006.01)

(52) U.S. Cl.
CPC ............ *G06F 3/064* (2013.01); *G06F 3/0652* (2013.01); *G06F 3/0658* (2013.01); *G06F 3/0679* (2013.01)

(58) Field of Classification Search
None
See application file for complete search history.

(56) References Cited

U.S. PATENT DOCUMENTS

| 9,484,104 | B2 | 11/2016 | Lee et al. |
| 10,089,020 | B2 | 10/2018 | Lee |
| 10,877,687 | B2 | 12/2020 | Rori et al. |
| 2008/0155184 | A1* | 6/2008 | Gorobets ............. G06F 3/0613 711/E12.008 |
| 2018/0102172 | A1 | 4/2018 | Yi |
| 2019/0080744 | A1 | 3/2019 | Kasai |
| 2020/0004453 | A1 | 1/2020 | Rori et al. |
| 2022/0276790 | A1* | 9/2022 | Zhu ...................... G06F 3/0643 |

OTHER PUBLICATIONS

Dean, J. et al., "The Tail at Scale", Communications of the ACM, Feb. 2013, pp. 74-80, vol. 56, Issue 2, 7 pages.
Carlson, M., "Achieving Predictable Latency for Solid State Drives", Storage Developer Conference EMEA, Feb. 2018, Tel Aviv, Israel, 32 pages.
Litz, H. et al., "RAIL: Predictable, Low Tail Latency for NVMe Flash", ACM Transactions on Storage, Jan. 2022, vol. 18, No. 1, Article 5, https://doi.org/10.1145/3465406, 21 pages.

* cited by examiner

*Primary Examiner* — Kevin Verbrugge
(74) *Attorney, Agent, or Firm* — Kim & Stewart LLP

(57) ABSTRACT

A memory system includes a nonvolatile memory including blocks, and a memory controller. The memory controller is configured to set each of the blocks to be in one of a plurality of states, including first, second, third, and fourth states. The memory controller is configured to detect a predetermined condition related to at least one of an amount of data being written into blocks in the first state and state transition of a block, upon detection of the predetermined condition, determine a maximum number of blocks to be in the fourth state based on a length of time during which each block in the fourth state has been in the fourth state, and perform an erase operation to cause one or more blocks in the third state to transition to the fourth state when a current number of blocks in the fourth state is less than the maximum number.

20 Claims, 23 Drawing Sheets

FIG. 5

| LOGICAL ADDRESS | PHYSICAL ADDRESS |
|---|---|
| L0 | P0 |
| L1 | P12 |
| L2 | P7 |
| L3 | P16 |
| L4 | P33 |
| ⋮ | ⋮ |

FIG. 8
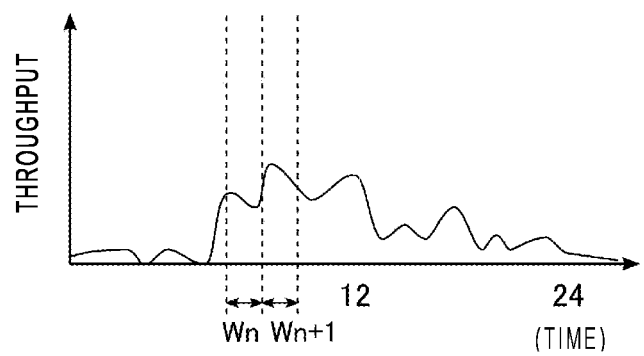
FIG. 9
| NUMBER OF BLOCK TRANSITIONS IN PERIOD Wn | A |
| --- | --- |
| ERASED-STATE TIME LIMIT | B |
FIG. 10
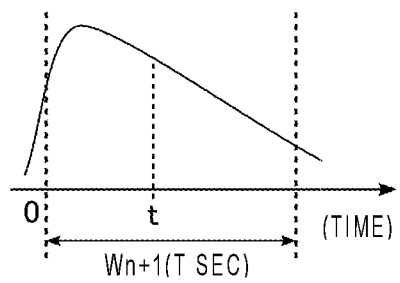

FIG. 11

| NUMBER OF WRITING/ERASING TIMES | ERASED-STATE TIME LIMIT |
|---|---|
| < 250 | $\alpha$ |
| ⋮ | ⋮ |
| 3000 | $\beta$ |

FIG. 12
| LOGICAL ADDRESS OF ERASED BLOCK | USAGE TIME LIMIT |
|---|---|
| 2 | W |
| 4 | X |
| 10 | Y |
| 24 | Z |
FIG. 13
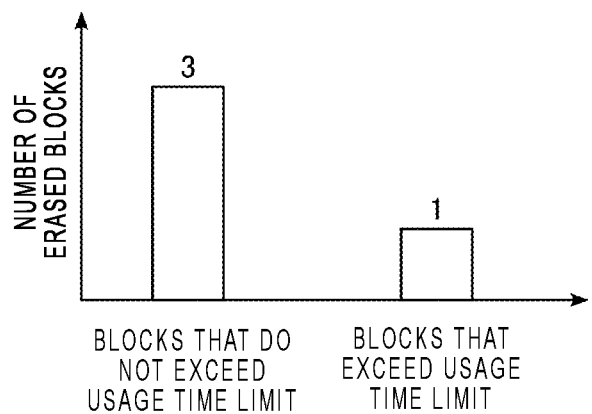
FIG. 14
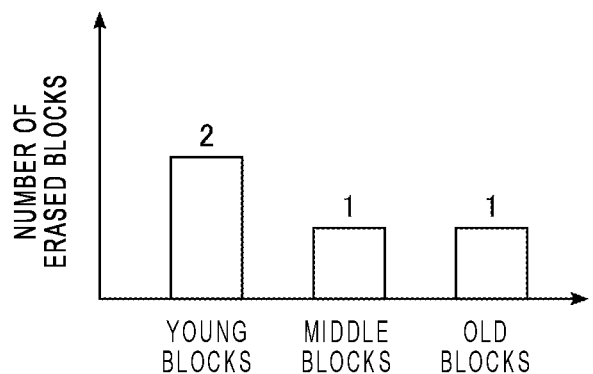

FIG. 20

| LOGICAL BLOCK ADDRESS | CHANNEL CH0 | | | | CHANNEL CH1 | | | | WORD LINE SWITCH ARRAY |
|---|---|---|---|---|---|---|---|---|---|
| | BANK BN0 | | BANK BN1 | | BANK BN0 | | BANK BN1 | | |
| | P0 | P1 | P0 | P1 | P0 | P1 | P0 | P1 | |
| MBA0 | 0 | 4 | 4 | 0 | 0 | 4 | 0 | 0 | WS0 |
| MBA1 | 1 | 5 | 5 | 1 | 5 | 5 | 1 | 1 | WS1 |
| MBA2 | 2 | 2 | 2 | 6 | 6 | 6 | 2 | 6 | WS2 |
| MBA3 | 3 | 7 | 3 | 7 | 3 | 7 | 3 | 7 | WS3 |
| MBA4 | 4 | 0 | 0 | 4 | 4 | 0 | 4 | 4 | WS0 |
| MBA5 | 5 | 1 | 1 | 5 | 1 | 1 | 5 | 5 | WS1 |
| MBA6 | 6 | 6 | 6 | 2 | 2 | 2 | 6 | 2 | WS2 |
| MBA7 | 7 | 3 | 7 | 3 | 7 | 3 | 7 | 3 | WS3 |

FIG. 21

| LOGICAL BLOCK ADDRESS | CHANNEL CH0 | | | | CHANNEL CH1 | | | | BLOCK DECODER GROUP |
|---|---|---|---|---|---|---|---|---|---|
| | BANK BN0 | | BANK BN1 | | BANK BN0 | | BANK BN1 | | |
| | P0 | P1 | P0 | P1 | P0 | P1 | P0 | P1 | |
| MBA0 | 0 | 4 | 7 | 1 | 2 | 5 | 0 | 0 | G0 (or G1) |
| MBA1 | 1 | 5 | 6 | 2 | 0 | 7 | 1 | 2 | G0 (or G1) |
| MBA2 | 2 | 6 | 4 | 0 | 1 | 6 | 2 | 1 | G0 (or G1) |
| MBA3 | 3 | 7 | 5 | 3 | 3 | 4 | 3 | 3 | G0 (or G1) |
| MBA4 | 4 | 0 | 0 | 1 | 4 | 0 | 4 | 4 | G1 (or G0) |
| MBA5 | 5 | 1 | 1 | 0 | 6 | 1 | 5 | 5 | G1 (or G0) |
| MBA6 | 6 | 2 | 2 | 2 | 5 | 2 | 6 | 7 | G1 (or G0) |
| MBA7 | 7 | 3 | 3 | 3 | 7 | 3 | 7 | 6 | G1 (or G0) |

FIG. 23

| WORD LINE SWITCH ARRAY | NUMBER OF FREE BLOCKS | AVERAGE VALUE OF NUMBER OF WRITING/ERASING TIMES |
|---|---|---|
| WS0 | 10 | 900 |
| WS1 | 2 | 1000 |
| WS2 | 4 | 970 |
| WS3 | 1 | 980 |

FIG. 24

| BLOCK DECODER GROUP | NUMBER OF FREE BLOCKS | AVERAGE VALUE OF WRITING/ERASING TIMES |
|---|---|---|
| G0 | 2 | 100 |
| G1 | 1 | 110 |
| G2 | 0 | 105 |
| G3 | 0 | 104 |
| G4 | 1 | 107 |
| G5 | 2 | 102 |

(A)

MEMORY SYSTEM

CROSS-REFERENCE TO RELATED APPLICATION(S)

This application is based upon and claims the benefit of priority from Japanese Patent Application No. 2022-014123, filed Feb. 1, 2022, the entire contents of which are incorporated herein by reference.

FIELD

Embodiments described herein relate generally to a memory system including a semiconductor memory.

BACKGROUND

As a semiconductor memory, for example, a NAND type flash memory in which memory cells are two- or three-dimensionally arranged is known. Further, a memory system including a NAND type flash memory and a memory controller that controls the NAND type flash memory is known.

BRIEF DESCRIPTION OF THE DRAWINGS

FIG. 5 is a diagram illustrating an example of a logical-to-physical address conversion table in the first embodiment.

FIG. 8 is a diagram to explain a method of calculating the maximum number of blocks in the first embodiment.

FIG. 9 is a diagram to explain another method of calculating the maximum number of blocks in the first embodiment.

FIG. 10 is a diagram to explain still another method of calculating the maximum number of blocks in the first embodiment.

FIG. 11 is a diagram illustrating an example of an erased-state time limit table in the first embodiment.

FIG. 12 is a diagram illustrating an example of erased block information in the first embodiment.

FIG. 13 is a diagram illustrating another example of erased block information in the first embodiment.

FIG. 14 is a diagram illustrating still another example of erased block information in the first embodiment.

FIG. 20 is an example of a table representing the correspondence between a logical block and a physical block in the memory system according to the third embodiment.

FIG. 21 is another example of a table illustrating the correspondence between a logical block and a physical block in the memory system according to the third embodiment.

FIG. 23 is an example of a table representing the number of free blocks corresponding to a word line switch array in the fourth embodiment.

FIG. 24 is an example of a table representing the number of free blocks corresponding to a block decoder group in the fourth embodiment.

DETAILED DESCRIPTION

Figure 1:
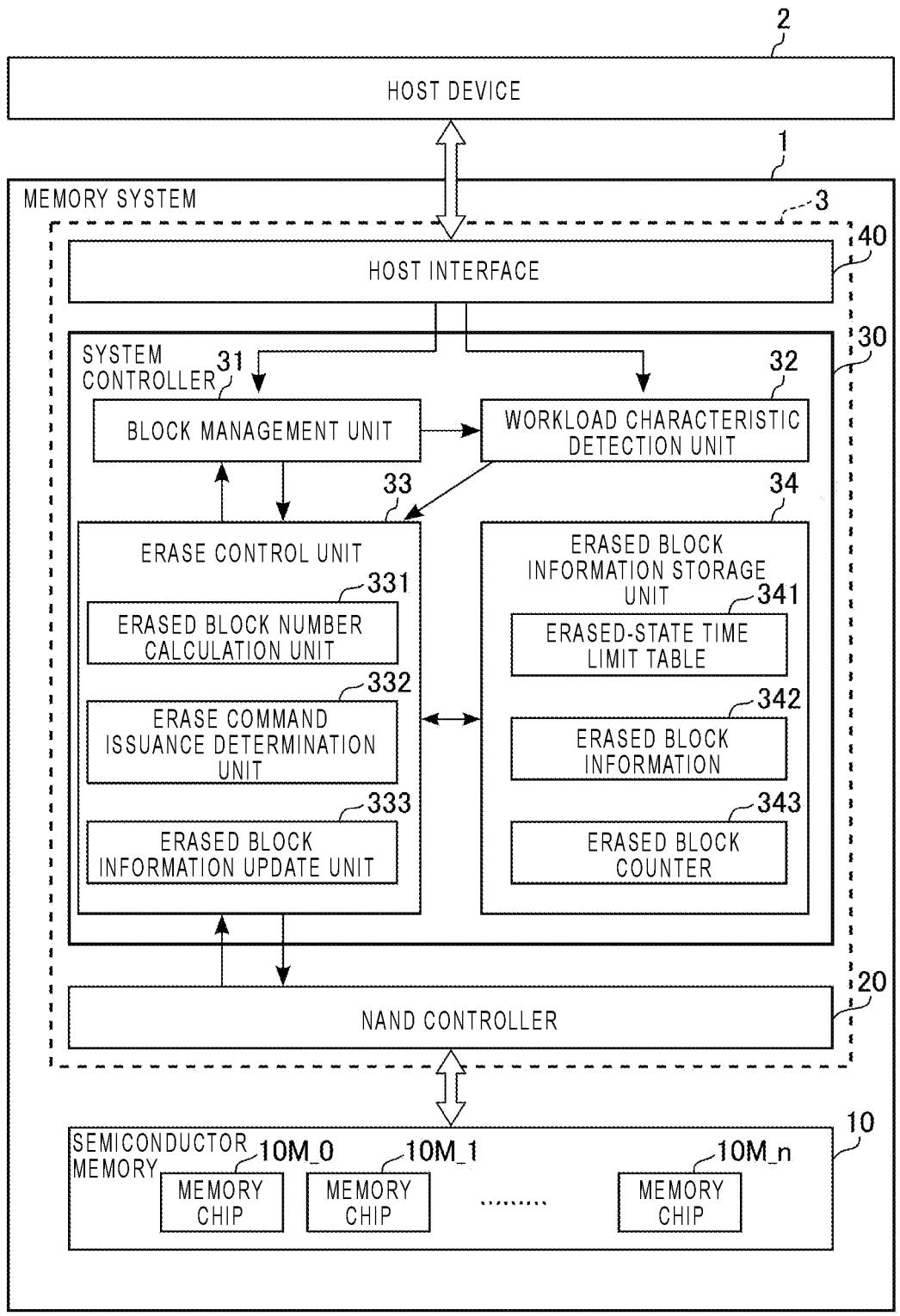
FIG. 1 is a block diagram illustrating a configuration of an information processing system including a memory system according to a first embodiment.

Embodiments provide a memory system with improved reliability and operation performance.

In general, according to an embodiment, a memory system includes a nonvolatile memory including a plurality of blocks, and a memory controller. The memory controller is configured to set each of the blocks to be in one of a plurality of states, including a first state at which writing and reading are enabled, a second state at which writing is disabled and reading is enabled, a third state at which stored data is invalidated, and a fourth state which is an erased-state. The memory controller is configured to detect a predetermined condition related to at least one of an amount of data being written into blocks in the first state and state transition of a block, upon detection of the predetermined condition, determine a maximum number of blocks to be in the fourth state based on a length of time during which each block in the fourth state has been in the fourth state, and perform an erase operation to cause one or more blocks in the third state to transition to the fourth state when a current number of blocks in the fourth state is less than the maximum number.

Hereinafter, embodiments of the present disclosure will be described with reference to the accompanying drawings. In the following descriptions, components having a similar function or configuration will be denoted by the same reference numerals. Further, each embodiment to be described hereinafter is an example of a device or a method for embodying the technical idea of the present disclosure, and does not limit materials, shapes, structures, arrangements and others of components to those described in the embodiments.

1. First Embodiment

A memory system according to a first embodiment will be described.

1.1 Configuration of Memory System

First, a configuration of a memory system according to the first embodiment will be described. FIG. 1 is a block diagram illustrating a configuration of an information processing system including the memory system according to the first embodiment. The information processing system includes a memory system 1 and a host device 2.

The memory system 1 includes a memory controller 3 and a semiconductor memory 10. The memory controller 3 includes a NAND controller 20, a system controller (e.g., a flash translation layer: FTL) 30, and a host interface 40. The memory system 1 is connected to the host device 2 external to the memory system 1, and may execute various operations in response to commands from the host device 2. That is, the memory controller 3 receives a command from the host device 2 and controls the semiconductor memory 10.

The host interface 40 performs an exchange of signals between the memory system 1 and the host device 2.

The system controller 30 is connected to the host device 2 via the host interface 40. The system controller 30 controls the entire memory system 1 according to a command received from the host device 2 via the host interface 40. The details of the system controller 30 will be described below.

The NAND controller 20 is connected to the semiconductor memory 10 via a NAND bus. The NAND bus performs transmission/reception of signals according to a NAND interface. Further, the NAND controller 20 accesses the semiconductor memory 10 in response to a request or command received from the system controller 30.

The semiconductor memory 10 is, for example, a nonvolatile memory. The semiconductor memory 10 includes multiple memory chips 10M_0, 10M_1, 10M_2, . . . , and 10M_n ("n" is a natural number of 0 or more). The memory chip 10M_n includes multiple memory cells, and stores data in a nonvolatile manner. The details of the semiconductor memory 10 will be described below.

The memory system 1 described above may be configured as one semiconductor device by combining, for example, the semiconductor memory 10, the NAND controller 20, the system controller 30, and the host interface 40, and examples thereof may include an SSD (solid state drive) and a memory card including an SSD™ card. The memory controller 3 may be, for example, a SoC (system-on-a-chip) or the like. Each component such as the NAND controller 20, the system controller 30, or the host interface 40 provided in the memory controller 3 may be implemented by any of a hardware configuration and a combination configuration of a hardware resource and firmware. The host device 2 is, for example, a digital camera, a personal computer, or the like.

1.1.1 Configuration of Semiconductor Memory 10

Next, the configuration of the semiconductor memory 10 in the memory system 1 will be described. As described above, the semiconductor memory 10 includes the multiple memory chips 10M_0 to 10M_n. The memory chip 10M_n includes, for example, a NAND-type flash memory capable of storing data in a nonvolatile manner.

1.1.1.1 Configuration of Memory Chip 10M_n

Figure 2:
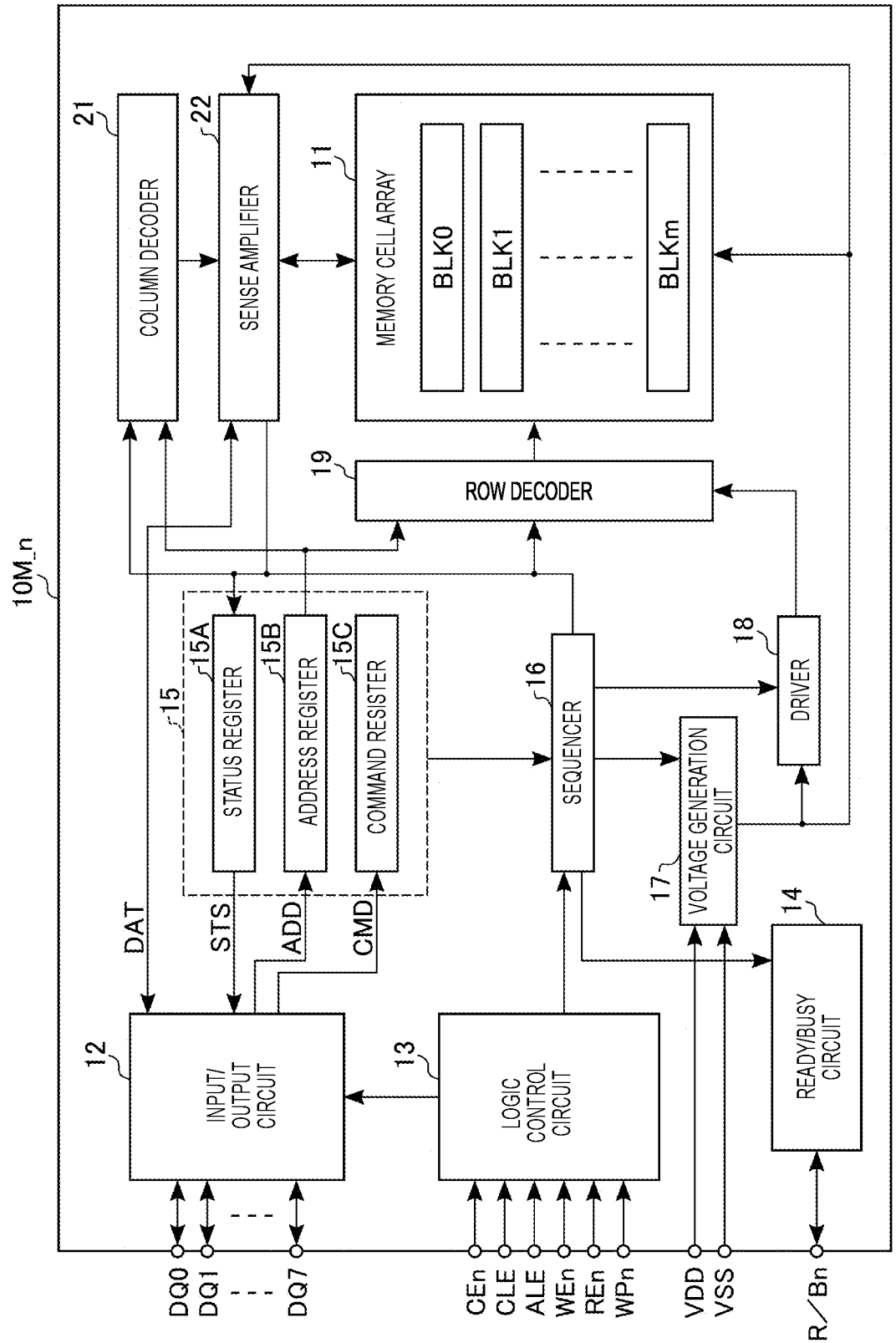
FIG. 2 is a block diagram illustrating a configuration of a memory chip in the first embodiment.

Hereinafter, the configuration of the memory chip 10M_n in the semiconductor memory 10 will be described. FIG. 2 is a block diagram illustrating the configuration of the memory chip 10M_n in the semiconductor memory 10.

The memory chip 10M_n includes a memory cell array 11, an input/output circuit 12, a logic control circuit 13, a ready/busy circuit 14, a register group 15, a sequencer (or control circuit) 16, a voltage generation circuit 17, a driver 18, a row decoder 19, a column decoder 21, and a sense amplifier 22. The register group 15 includes a status register 15A, an address register 15B, and a command register 15C.

The memory cell array 11 includes one or more blocks BLK0, BLK1, BLK2, . . . , and BLKm ("m" is a natural number of 0 or more). Each of the multiple blocks BLK0 to BLKm includes multiple memory cell transistors (hereinafter, also referred to as memory cells) associated with rows and columns. The memory cell transistors are nonvolatile memory cells that are electrically erasable and programmable. The memory cell array 11 includes multiple word lines, multiple bit lines, and a source line for applying voltages to the memory cell transistors. The specific configuration of the block BLKm will be described below.

The input/output circuit 12 and the logic control circuit 13 are connected to the NAND controller 20 via an input/output terminal (or a NAND bus). The input/output circuit 12 transmits and receives I/O signals DQ (e.g., DQ0, DQ1, DQ2, . . . , and DQ7) to/from the NAND controller 20 via the input/output terminal. The I/O signals DQ communicate commands, addresses, data, and others.

The logic control circuit 13 receives an external control signal from the NAND controller 20 via the input/output terminal (or the NAND bus). The external control signal includes, for example, a chip enable signal CEn, a command latch enable signal CLE, an address latch enable signal ALE, a write enable signal WEn, a read enable signal REn, and a write protect signal WPn. The "n" appended to the signal name indicates that the signal is active low.

The chip enable signal CEn enables selection of the memory chip 10M_n, and is asserted when the memory chip 10M_n is selected. The command latch enable signal CLE enables a command transmitted as a signal DQ to be latched in the command register 15C. The address latch enable signal ALE enables an address transmitted as a signal DQ to be latched in the address register 15B. The write enable signal WEn enables data transmitted as a signal DQ to be stored in the input/output circuit 12. The read enable signal REn enables data read from the memory cell array 11 to be output as a signal DQ. The write protect signal WPn is asserted when a write operation and an erase operation with respect to the memory chip 10M_n are inhibited.

The ready/busy circuit 14 generates a ready/busy signal R/Bn according to a control from the sequencer 16. The ready/busy signal R/Bn indicates whether the memory chip 10M_n is in a ready state or a busy state. The ready state is a state where the memory chip 10M_n is able to receive a command from the NAND controller 20. The busy state is a state where the memory chip 10M_n is unable to receive a command from the NAND controller 20. By receiving the ready/busy signal R/Bn from the memory chip 10M_n, the NAND controller 20 may determine whether the memory chip 10M_n is in the ready or busy state.

The status register 15A stores status information STS necessary for the operation of the memory chip 10M_n. The status register 15A transfers the status information STS to the input/output circuit 12 according to an instruction of the sequencer 16.

The address register 15B stores an address ADD transferred from the input/output circuit 12. The address ADD includes a row address and a column address. The row address includes, for example, a block address that specifies a block BLKm which is a target of an operation, and a page address that specifies a word line WL which is a target of an operation, in the specified block.

The command register 15C stores a command CMD transferred from the input/output circuit 12. The command CMD includes, for example, a write command for instructing the sequencer 16 to execute a write operation, a read command for instructing the sequencer 16 to execute a read operation, and an erase command for instructing the sequencer 16 to execute an erase operation. The erase command includes, for example, a single block erase command for executing an erase operation for one block, or a multi-block erase command for executing an erase operation for multiple blocks that share a bit line in parallel. Executing the erase operation in parallel refers to, for example, a situation where the erase operation is executed at substantially the same start timing for the multiple respective blocks, and ends at substantially the same timing. Further, executing the erase operation in parallel may refer to a situation where the period from the start to the end of the erase operation executed for one of the multiple blocks partially overlaps with the period from the start to the end of the erase operation executed for another block of the multiple blocks.

As for the status register 15A, the address register 15B, and the command register 15C, for example, an SRAM (static random access memory) is used.

The sequencer 16 receives a command from the command register 15C, and collectively controls the memory chip 10M_n according to a sequence based on the command.

The sequencer 16 controls, for example, the driver 18, the row decoder 19, the column decoder 21, the sense amplifier 22, and the voltage generation circuit 17, to execute the write operation, the read operation, and the erase operation. Specifically, based on a write command received from the command register 15C, the sequencer 16 controls the driver 18, the row decoder 19, the sense amplifier 22, and the voltage generation circuit 17, to write data to multiple memory cell transistors specified in the address ADD. Further, based on a read command received from the command register 15C, the sequencer 16 controls the driver 18, the row decoder 19, the column decoder 21, the sense amplifier 22, and the voltage generation circuit 17, to read data from multiple memory cell transistors specified in the address ADD. Further, based on an erase command received from the command register 15C, the sequencer 16 controls the driver 18, the row decoder 19, the column decoder 21, the sense amplifier 22, and the voltage generation circuit 17, to erase data stored in a block specified in the address ADD.

The voltage generation circuit 17 receives a power supply voltage VDD and a ground voltage VSS from the outside of the memory chip 10M_n via a power supply terminal. The power supply voltage VDD is an external voltage supplied from the outside of the memory chip 10M_n, and is, for example, 3.3 V. The ground voltage VSS is an external voltage supplied from the outside of the memory chip 10M_n, and is, for example, 0 V.

By using the power supply voltage VDD, the voltage generation circuit 17 generates multiples voltages necessary for the write operation, the read operation, and the erase operation. The voltage generation circuit 17 supplies the generated voltages to the memory cell array 11, the driver 18, the sense amplifier 22, and others.

The driver 18 receives the multiple voltages from the voltage generation circuit 17. The driver 18 supplies multiple voltages selected from the multiple voltages supplied from the voltage generation circuit 17 according to the read operation, the write operation, the erase operation, and others, to the row decoder 19 via multiple signal lines. For example, the driver 18 supplies an erase voltage VERA supplied from the voltage generation circuit 17, to the source line during the erase operation.

The row decoder 19 receives a row address from the address register 15B, and decodes the row address. The row decoder 19 selects one of the multiple blocks based on the decoding result of the row address, and further selects a word line WL in the selected block BLKm. Further, the row decoder 19 transfers the multiple voltages supplied from the driver 18, to the selected block BLKm.

The column decoder 21 receives a column address from the address register 15B, and decodes the column address. The column decoder 21 selects a bit line based on a decoding result of the column address.

During the read operation of data, the sense amplifier 22 detects and amplifies data read from memory cell transistors into a bit line. Further, the sense amplifier 22 temporarily stores read data DAT read from memory cell transistors, and transfers the stored read data DAT to the input/output circuit 12. Further, during the write operation of data, the sense amplifier 22 temporarily stores write data DAT transferred from the input/output circuit 12. Further, the sense amplifier 22 transfers the write data DAT to a bit line.

1.1.1.2 Configuration of Block

Next, the circuit configuration of the memory cell array 11 in the memory chip 10M_n will be described. As described above, the memory cell array 11 includes the multiple blocks BLK0 to BLKm. The circuit configuration of the block BLKm will be described below.

Figure 3:
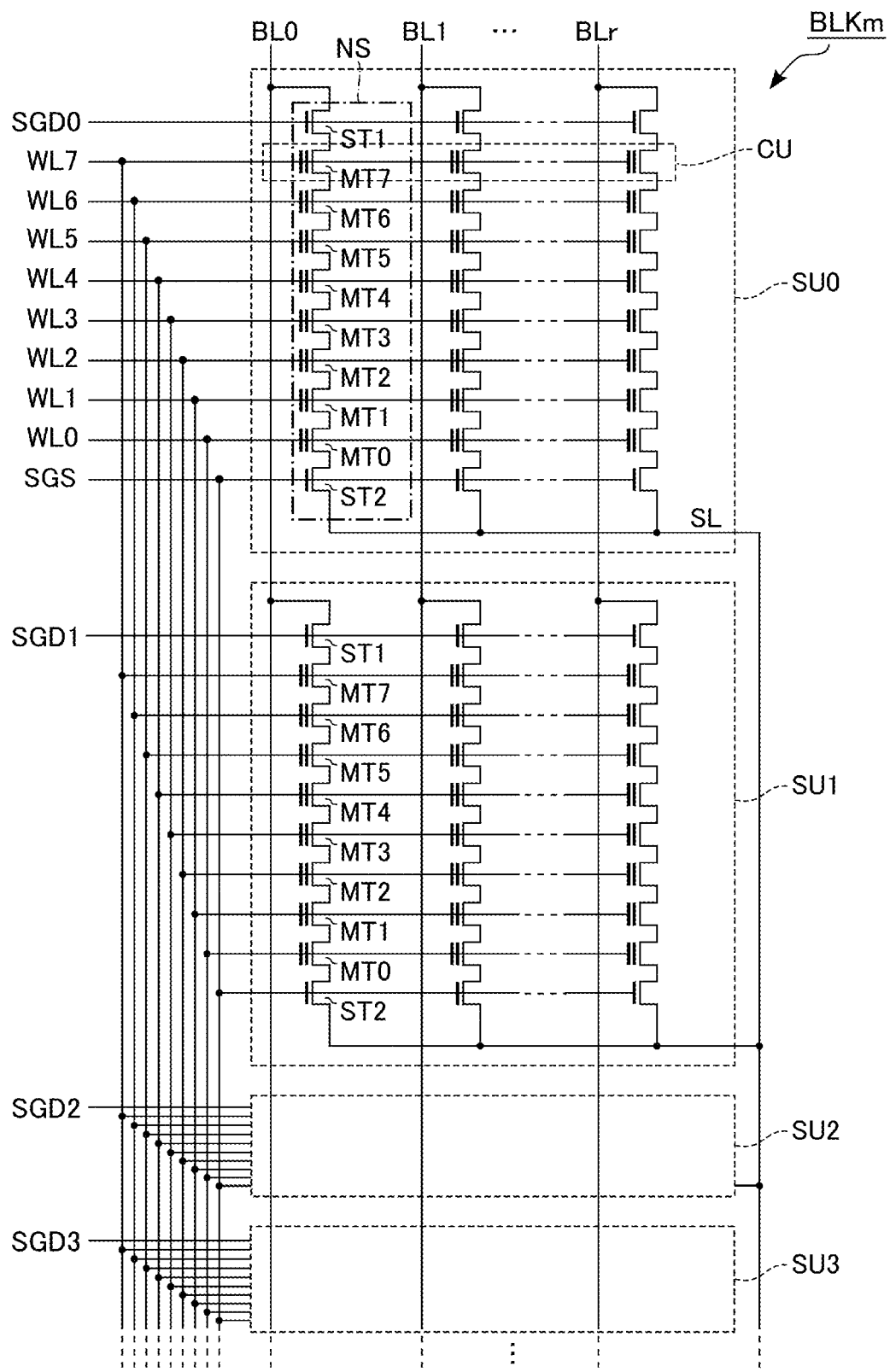
FIG. 3 is a circuit diagram of a block in a memory cell array in the first embodiment.

FIG. 3 is a circuit diagram of the block BLKm in the memory cell array 11. The block BLKm includes, for example, multiple string units SU0, SU1, SU2, and SU3. Hereinafter, "string unit SU" represents each of the string units SU0 to SU3. The string unit SU includes multiple NAND strings (may be referred to memory strings) NS.

Here, for the convenience of descriptions, descriptions will be made on an example where each NAND string NS includes, for example, eight memory cell transistors MT0, MT1, MT2, . . . , and MT7, and two select transistors ST1 and ST2. Hereinafter, "memory cell transistor MT" represents each of the memory cell transistors MT0 to MT7.

The memory cell transistor MT includes a control gate and a charge storage layer, and stores data in a nonvolatile manner. The memory cell transistors MT0 to MT7 are connected to each other in series between the source of the select transistor ST1 and the drain of the select transistor ST2. The memory cell transistor MT is capable of storing data of one bit or data of two or more bits.

The gates of the multiple select transistors ST1 of the string unit SU0 are connected to a select gate line SGD0. Similarly, the gates of the select transistors ST1 of the respective string units SU1 to SU3 are connected to select gate lines SGD1 to SGD3, respectively. Each of the select gate lines SGD0 to SGD3 is independently controlled by the row decoder 19.

The gates of the multiple select transistors ST2 of the string unit SU0 are connected to a select gate line SGS. Similarly, the gates of the select transistors ST2 of the respective string units SU1 to SU3 are connected to the select gate line SGS. In addition, individual select gate lines SGS may be connected to the gates of the select transistors ST2 of the string units SU0 to SU3, respectively. The select transistors ST1 and ST2 are used for selecting the string unit SU in the various operations.

The control gates of the memory cell transistors MT0 to MT7 of the block BLKm are connected to word lines WL0 to WL7, respectively. Each of the word lines WL0 to WL7 is independently controlled by the row decoder 19.

Each of bit lines BL0 to BLr ("r" is a natural number of 0 or more) is connected to the multiple blocks BLK0 to BLKm, and is connected to one NAND string NS in the string unit SU of the block BLKm. That is, each of the bit lines BL0 to BLr is connected to the drains of the select transistors ST1 of the multiple NAND strings NS in the same row among the NAND strings NS arranged in the matrix form in the block BLKm. Further, a source line SL is connected to the multiple blocks BLK0 to BLKm. That is, the source line SL is connected to the sources of the multiple select transistors ST2 of the block BLKm.

In summary, the string unit SU includes the multiple NAND strings NS connected to the different bit lines BL and connected to the same select gate line SGD. Further, the block BLKm includes the multiple string units SU having a common word line WL. Further, the memory cell array 11 includes the multiple blocks BLK0 to BLKm having a common bit line BL.

The block BLKm is, for example, a unit of erasing data. That is, data stored in the memory cell transistors MT of the block BLKm are collectively erased. Data in the multiple blocks are sequentially erased for each block. Alternatively, the erasing may be executed for the multiple blocks in parallel, so as to erase the data in the multiple blocks. Further, the data may be erased in units of the string unit SU or in units of less than the string unit SU.

The multiple memory cell transistors MT sharing a word line WL in one string unit SU will be referred to as a cell unit CU. A group of 1-bit data stored in the multiple respective memory cell transistors MT of the cell unit CU will be referred to as a page. The storage capacity of the cell unit CU changes according to the number of bits of data stored in the memory cell transistors MT. For example, the cell unit CU stores 1-page data when each memory cell transistor MT stores 1-bit data, 2-page data when each memory cell transistor MT stores 2-bit data, and 3-page data when each memory cell transistor MT stores 3-bit data.

The write operation and the read operation with respect to the cell unit CU are performed in units of a page. In other words, the read operation and the write operation are performed collectively for the multiple memory cell transistors MT connected to one word line WL provided in one string unit SU.

The number of string units in the block BLKm is not limited to SU0 to SU3, and may be set to any value. Further, the number of NAND strings NS in the string unit SU, and the number of memory cell transistors and select transistors in the NAND string NS may also be set to any value. Further, the memory cell transistor MT may be an MONOS (metal-oxide-nitride-oxide-silicon) type, in which an insulating film is used as the charge storage layer, or an FG (floating gate) type, in which a conductive layer is used as the charge storage layer.

1.1.2 Configuration of System Controller 30

Next, the system controller 30 of the memory system 1 will be described. As illustrated in FIG. 1, the system controller 30 includes a block management unit 31, a workload characteristic detection unit 32, an erase control unit 33, and an erased block information storage unit 34.

The block management unit 31 manages the blocks provided in the multiple memory chips 10M_0 to 10M_n of the semiconductor memory 10.

Figure 4:
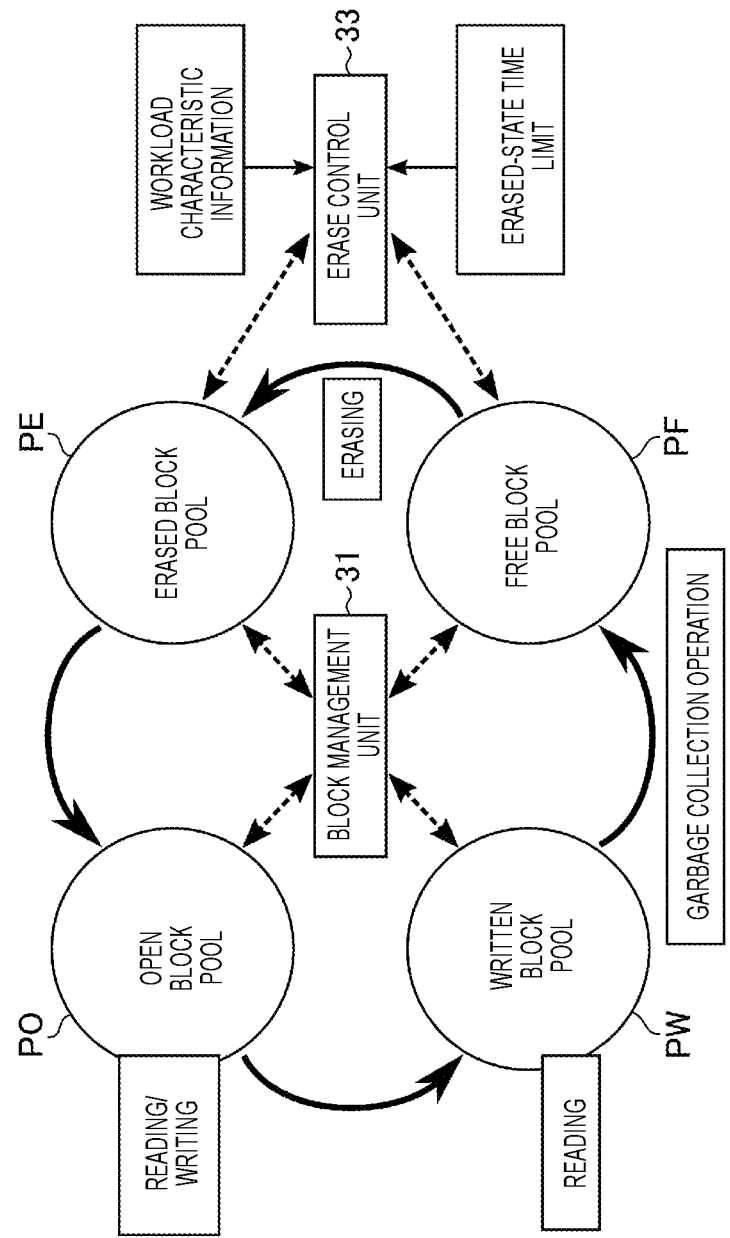
FIG. 4 is a diagram illustrating a block state transition in the memory system according to the first embodiment.

FIG. 4 is a diagram illustrating a block state transition managed by the block management unit 31 of the memory system 1. As illustrated in FIG. 4, a block belongs to one of four pools which include an open block pool P0, a written block pool PW, a free block pool PF, and an erased block pool PE.

A block belonging to the open block pool P0 is a block in which a data writing is possible and a data reading is also possible. Hereinafter, the block belonging to the open block pool P0 will be referred to as an open block.

A block belonging to the written block pool PW is a block in which the data reading, but not the data writing, is possible. In other words, the block of the written block pool PW is a block in which the data writing is inhibited, and the data reading is possible. Hereinafter, the block belonging to the written block pool PW will be referred to as a written block.

A block belonging to the free block pool PF is a block which is released after valid data in the block are copied into another block through, for example, a garbage collection (or compaction). In other words, the block in the free block pool PF is a block in which all of stored data are invalid data, and a data erasing is possible. The garbage collection is an operation to migrate valid data of a target written block to an open block. Hereinafter, the block belonging to the free block pool PF will be referred to as a free block.

Here, the valid data and the invalid data stored in a block will be described. The memory controller 3 includes a logical-to-physical address conversion table representing the correspondence between a logical address and a physical address. For example, the logic-to-physical address conversion table is stored in the NAND controller 20. FIG. 5 illustrates an example of the logical-to-physical address conversion table. The logical address is managed by the host device 2. The physical address is managed by the memory controller 3, and indicates a storage location of the semiconductor memory 10. For example, a logical address L0 is associated with a physical address P0, and a logical address L1 is associated with a physical address P12.

For example, the host device 2 transmits a logical address to the memory controller 3. The memory controller 3 refers to the logical-to-physical address conversion table, and converts the received logical address into a physical block address and a physical page address. The memory controller 3 accesses the semiconductor memory 10, by the converted physical block address and physical page address. The valid data described above refer to data stored in a block (or a physical address) associated with a logical address, and the invalid data refer to data stored in a block that is not associated with a logical address.

A block belonging to the erased block pool PE is a block generated when an erasing is executed for a free block and stored data are erased. In other words, the block of the erased block pool PE is a block in which data are erased, and a writing and a reading are inhibited. Hereinafter, the block belonging to the erased block pool PE will be referred to as an erased block.

The block management unit 31 performs a transition of each block among the open block pool P0, the written block pool PW, the free block pool PF, the erased block pool PE, according to the state of the block, that is, whether each block is the open block, the written block, the free block, or the erased block. That is, based on the state of each block, the block management unit 31 performs a transition of the block from the open block pool P0 to the written block pool PW, from the written block pool PW to the free block pool PF, from the free block pool PF to the erased block pool PE, or from the erased block pool PE to the open block pool P0. Further, the block management unit 31 manages which of the four pools each block belongs to.

Here, reliability of a data storage in the erased block belonging to the erased block pool PE will be described.

When an erased block is left in the erased state for a long time after the data erasing is executed and a writing is executed thereafter (i.e., after the erased block transitions to the open block), an uncorrectable error (UNC) is highly likely to occur in the memory cells in the block. For that reason, it is desirable to use the erased block as the open block within a time when the UNC is unlikely to occur after the data erasing. Hereinafter, when the erased block is left unwritten after the data erasing, the time period after the data erasing during which the occurrence rate of UNC in the memory cells of the block remains below a threshold will be referred to as an erased-state time limit.

Referring back to FIG. 1, the workload characteristic detection unit 32 detects an amount of data writing to the open block (or write characteristic), and the number of blocks transitioned from one pool to another pool (hereinafter, referred to as the number of block transitions).

The erase control unit 33 controls the erase operation for the free block. The erase control unit 33 includes an erased block number calculation unit 331, an erase command issuance determination unit 332, and an erased block information update unit 333. The erased block number calculation unit 331 calculates the maximum number of blocks, which is the maximum value of the number of erased blocks that need to belong to the erased block pool PE, based on the amount of writing or the number of block transitions, the erased-state time limit of an erased block, and erased block information 342 (and a count value of an erased block counter 343). The erase command issuance determination unit 332 instructs the NAND controller 20 to issue an erase command based on the calculated maximum number of blocks. The erased block information update unit 333 receives a response of erase completion from the NAND controller 20, and updates information and values in the erased block information storage unit 34.

The erased block information storage unit 34 stores information and values necessary for controlling the erase operation for the free blocks. The erased block information storage unit 34 includes an erased-state time limit table 341, the erased block information 342, and the erased block counter 343. The erased-state time limit table 341 stores for each entry the number of times of writing and erasing in an erased block, in association with the erased-state time limit for the erased block having such number of writing and erasing times. The erased block information 342 includes information on an elapsed time after the data erasing of erased blocks. The erased block counter 343 counts the number of blocks transitioned from the free block to the erased block, that is, the number of generated erased blocks, during a time from a first timing to a second timing, and stores the number of generated erased blocks as a count value. The count value of the erased block counter 343 is initialized (becomes, for example, 0), when the time shifts from a first period from a second period, or before the maximum number of blocks is calculated initially in the first period.

1.2 Operation of Memory System

Figure 6:
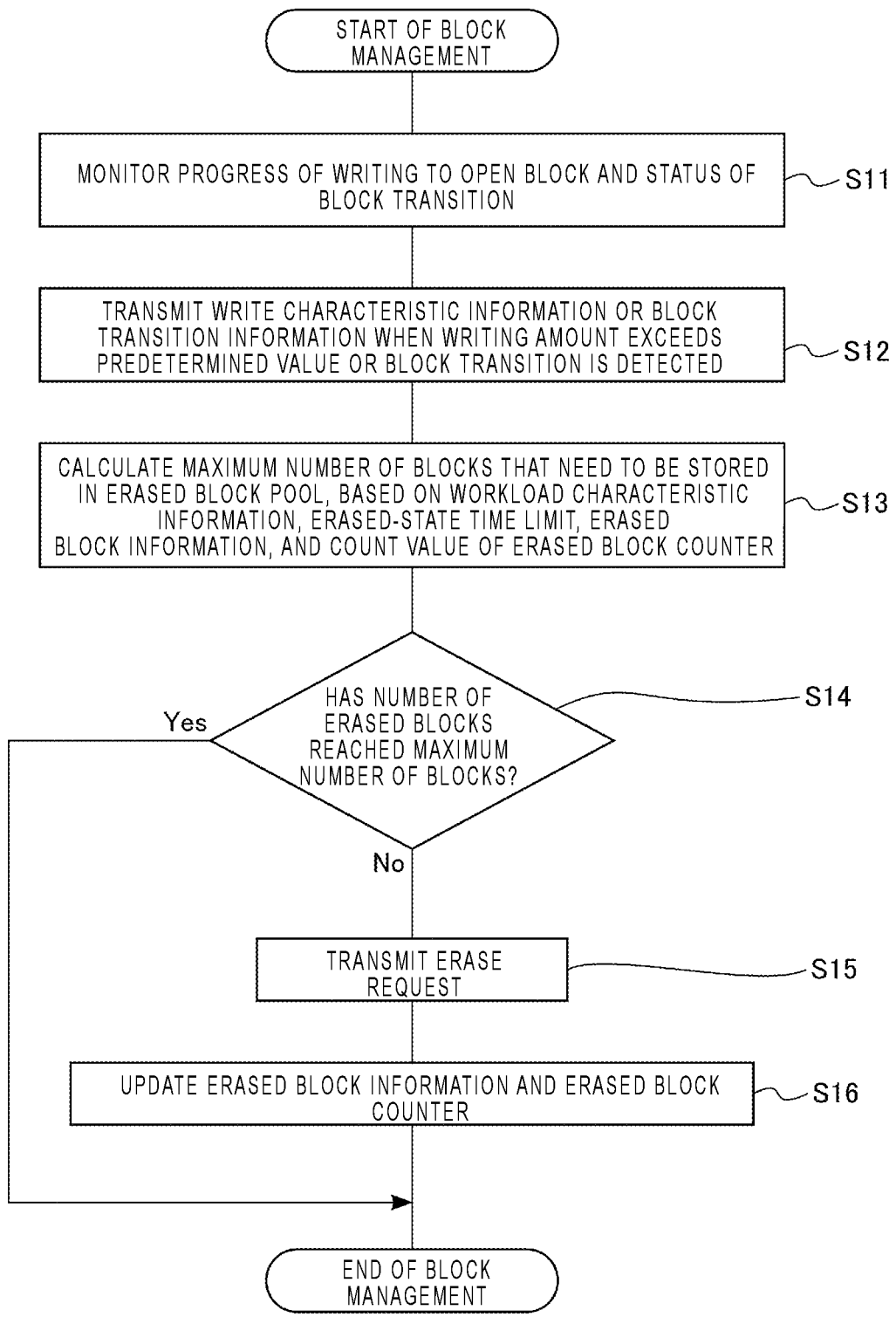
FIG. 6 is a flowchart illustrating a control of block management according to the first embodiment.
Figure 7:
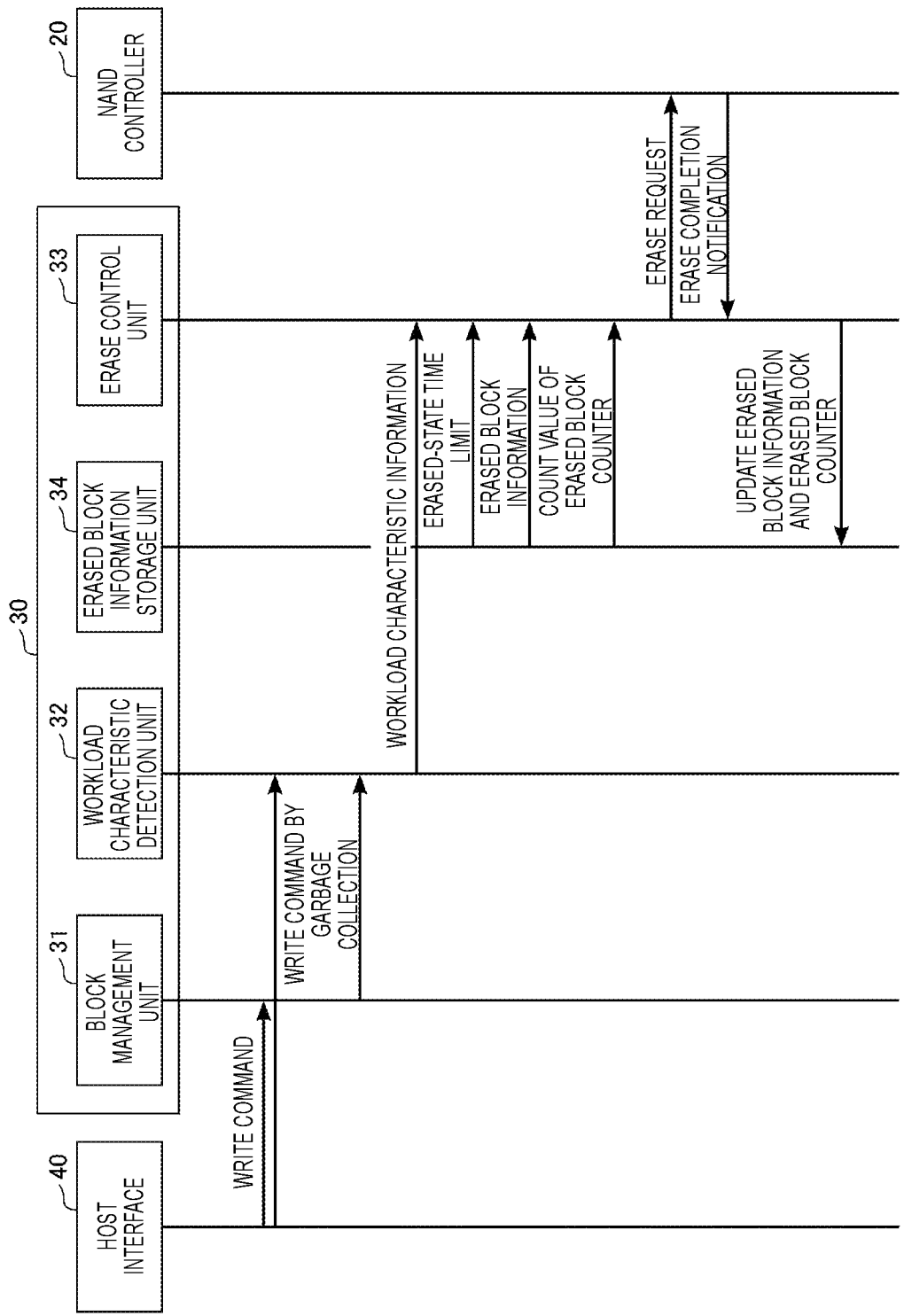
FIG. 7 is a sequence chart illustrating an exchange of signals and information for the control of block management in the first embodiment.

Next, the control of block management in the memory system 1 according to the first embodiment will be described. FIG. 6 is a flowchart illustrating the control of block management according to the first embodiment. FIG. 7 is a diagram illustrating the exchange of signals and information in the control of block management. The control of block management is executed by the system controller 30.

First, the block management unit 31 and the workload characteristic detection unit 32 receive the write command from the host device 2 via the host interface 40. Further, the block management unit 31 executes, for example, the garbage collection in accordance with an internal stored control program or the like. As a result, the workload characteristic detection unit 32 also receives a write command caused by the garbage collection. More specifically, when valid data are migrated to an open block by the execution of the garbage collection, a write command is issued. A written block for which the garbage collection has been executed is transitioned to a free block.

When the write command from the host device 2 or the write command caused by the garbage collection is received, the workload characteristic detection unit 32 monitors the progress of the data writing to the open block. The workload characteristic detection unit 32 also monitors the status of block transition among the pools through the block management unit 31 (S11).

Next, when the amount of writing to open blocks exceeds a predetermined value, the workload characteristic detection unit 32 transmits write characteristic information to the erase control unit 33 (S12). The write characteristic information is information on the writing to the open blocks, and includes the amount of writing to the open blocks and the frequency of the writing. In addition, when the amount of writing to the open blocks exceeds the predetermined value, the erase operation is executed for a free block belonging to the free block pool PF, and thus, the predetermined value may also be referred to as an erase execution threshold value.

When a block transition from the free block pool PF to the erased block pool PE or a block transition from the written block pool PW to the free block pool PF is detected, the workload characteristic detection unit 32 transmits block transition information to the erase control unit 33 (S12). The block transition information is information on a block transitioned among the four pools, and includes the number of blocks transitioned among the four pools and the frequency of the transition. Hereinafter, at least one of the write characteristic information and the block transition information will be referred to as workload characteristic information.

Then, when the workload characteristic information, that is, at least one of the write characteristic information and the block transition information, is received, the erased block number calculation unit 331 in the erase control unit 33 acquires the erased-state time limit from the erased-state time limit table 341, and the erased block information 342 from the erased block information storage unit 34. The erased block information 342 includes elapsed time information after the data erasing of the erased blocks. The elapsed time information includes at least one of the elapsed time after the data erasing of the erased block, a remaining time until the elapsed time after the data erasing of the erased block reaches the erased-state time limit, and information as to whether the elapsed time after the data erasing of the erased block exceeds the erased-state time limit. The remaining time is the time obtained by subtracting the elapsed time after the data erasing from the erased-state time limit of the erased block.

The erased block number calculation unit 331 calculates the maximum number of blocks for the erased blocks that need to belong to the erased block pool PE, based on the workload characteristic information, the erased-state time limit, and the erased block information 342.

Here, the erased block number calculation unit 331 further acquires the count value of the erased block counter 343 from the erased block information storage unit 34. The count value indicates the number of blocks transitioned from the free block pool PF to the erased block pool PW during the time from the first timing to the second timing, that is, the number of generated erased blocks. The erased block number calculation unit 331 may calculate the maximum number of blocks for the erased blocks that need to belong to the erased block pool PE, based on the count value of the erased block counter 343, in addition to the workload characteristic information, the erased-state time limit, and the erased block information 342 (S13). As a result, it is possible to more accurately calculate the maximum number of blocks that varies during the time from the first timing to the second timing. The method of calculating the maximum number of blocks will be described below.

Then, the erase command issuance determination unit 332 in the erase control unit 33 determines whether the number of erased blocks belonging to the erased block pool PE has reached the calculated maximum number of blocks (S14).

When it is determined that the number of erased blocks has not reached the maximum number of blocks (No), the erase command issuance determination unit 332 sends an erase request to the NAND controller 20 (S15). The erase request is a signal for requesting the NAND controller 20 to issue an erase command (e.g., a single block erase command). When the erase request is received, the NAND controller 20 issues an erase command to the semiconductor memory 10. When the erase command is received, the memory chip 10M_n in the semiconductor memory 10 executes an erasing for the free block. The memory system 1 according to the first embodiment has a single block erase function. In the single block erase function, when the erasing target is multiple blocks, the blocks are erased one by one.

Then, when the erasing for the blocks of the memory chip 10M_n is completed, the erased block information update unit 333 in the erase control unit 33 receives a notification indicating the completion of the erasing, from the NAND controller 20. When the erase completion notification is received, the erased block information update unit 333 updates the erased block information 342 and the count value of the erased block counter 343 in the erased block information storage unit 34 (S16). Then, the system controller 30 ends the control of block management.

Meanwhile, when it is determined in step S14 that the number of erased blocks has reached the maximum number of blocks (Yes in S14), the system controller 30 ends the control of block management.

Hereinafter, the method of calculating the maximum number of blocks for the erased blocks that need to belong to the erased block pool PE will be described below.

As described above, when the amount of writing to the open block exceeds the erase execution threshold value, the workload characteristic detection unit 32 transmits the write characteristic information to the erase control unit 33. Further, when a block transition from the free block pool PF to the erased block pool PE or a block transition from the written block pool PW to the free block pool PF is detected, the workload characteristic detection unit 32 transmits the block transmission information to the erase control unit 33. When at least one of the write characteristic information and the block transition information is received, the erase control unit 33 executes the following process.

FIG. 8 represents a relationship between an elapse of time and a throughput in the memory system 1. The throughput such as, for example, the amount of writing processed by the memory system 1 changes with elapse of time.

In the present embodiment, as illustrated in FIG. 9, "A" refers to the number of block transitions from the open block pool P0 to the written block pool PW during a period Wn, and "B" refers to the erased-state time limit. Further, assuming that each of periods Wn and Wn+1 is T (seconds), the maximum number of blocks NBmax for the erased blocks that need to belong to the erased block pool PE during the period Wn+1 is calculated. The maximum number of blocks NBmax may be expressed by the following equation (1).

$$NB\text{max} = \text{floor}((A \times B)/T) \quad (1)$$

In the descriptions above, the "A" of the equation (1) refers to the number of block transitions from the open block pool P0 to the written block pool PW. However, the present disclosure is not limited thereto. The "A" may be any number as long as the amount of writing to the block may be estimated. For example, the "A" may be the number of block transitions from the free block pool PF to the erased block pool PE, the number of block transitions from the written block pool PW to the free block pool PF, or the write characteristic information described above.

Further, the maximum number of blocks NB'max which is more accurate than NBmax may be obtained by using the maximum number of blocks NBmax, the erased block information 342, and the count value of the erased block counter 343.

As illustrated in FIG. 10, "t" indicates a timing that changes within timings 0 to T in the period Wn+1 having the time T (seconds). Further, "NBmax" indicates the maximum number of blocks NBmax immediately after the elapse of the period Wn, and "Nc" indicates the number of blocks transitioned from the free block pool PF to the erased block pool PE in the period Wn+1, that is, the count value of the erased block counter 343. Then, the maximum number of blocks NB'max at the timing "t" in the period Wn+1 may be expressed by the following equation (2).

$$NB'\text{max} = \text{Function}(NB\text{max}, t, Nc) \quad (2)$$

More specifically, the maximum number of blocks NB'max may be expressed by the equation (3) or (4) described herein below.

FIGS. 11 to 14 illustrate an example of the information stored in the erased block information storage unit 34. FIG. 11 illustrates the erased-state time limit table 341. The erased-state time limit table 341 represents the erased-state time limit that corresponds to the number of writing and erasing times in an erased block. For example, for an erased block for which the number of writing and erasing times is smaller than 250, the erased-state time limit is "α". For an erased block for which the number of writing and erasing times is about 3,000, the erased-state time limit is "β", where α>β.

FIGS. 12 to 14 illustrate the erased block information 342. FIG. 12 is a table representing erased blocks belonging to the erased block pool PE and a usage time limit of the erased blocks. The usage time limit is a timing obtained by adding an erased-state time limit B to a timing immediately after an erasing is executed for a block. FIGS. 13 and 14 illustrate the state of the erased blocks belonging to the erased block pool PE after the data erasing, and the number of erased blocks. FIG. 13 represents the number of erased blocks for each of two cases classified according to whether the erased blocks do not exceed the usage time limit or exceed the usage time limit. FIG. 14 represents the number of erased blocks for each of three types of erased blocks classified into young blocks in which no time has elapsed after the data erasing, old blocks in which the time has elapsed, and middle blocks of the young and old blocks.

$$NB'\text{max}=\text{Function } 1(NB\text{max},t,Nc)=(NB\text{max}\times(t/T)-\\ \text{(the number of blocks that exceed the usage time limit))} \quad (3)$$

In the equation (3) above, the "number of blocks that exceed the usage time limit" corresponds to the "number of blocks that exceed the usage time limit" illustrated in FIG. 13.

Further, when Practical Value=round(1.0×NByoung+1.2× NBmiddle+1.5×NBold), $$NB'\text{max}=\text{Function } 2(NB\text{max},t,Nc)=(NB\text{max}\times(t/T)-\\ \text{Practical Value)} \quad (4)$$

The condition that satisfies the equation (4) above is (NBmax×(t/T)>Practical Value). In the equation (4), the NByoung corresponds to the number of "young blocks" illustrated in FIG. 14. The NBmiddle corresponds to the number of "middle blocks" illustrated in FIG. 14, and the NBold corresponds to the number of "old blocks" illustrated in FIG. 14.

Here, as described above, when the number of erased blocks belonging to the erased block pool PE has not reached the maximum number of blocks NB'max, the erase control unit 33 transmits the erase request to the NAND controller 20. Then, after the erasing of blocks is completed, the information and the values in the erased block information storage unit 34 are updated.

1.3 Effects of First Embodiment

According to the first embodiment, it is possible to provide the memory system with improved reliability and operation performance.

Hereinafter, the effects of the first embodiment will be described.

In the memory system according to the first embodiment, the optimal maximum number of blocks for the erased blocks that need to belong to the erased block pool PE is calculated, based on the progress status of data writing to the open blocks or the status of block transition among the pools, the erased-state time limit of erased blocks, and the elapsed time information of erased blocks after the data erasing. Further, the erase operation for the free block is controlled such that the number of erased blocks belonging to the erased block pool PE is set to the maximum number of blocks.

With the configuration described above, the erased blocks belonging to the erased block pool PE are maintained so as not to exceed the calculated maximum number of blocks, so that the time during which the erased blocks are left after the data erasing may be controlled to the time in which the occurrence of the uncorrectable error (UNC) may be reduced. As a result, the UNC occurring in the semiconductor memory 10 may be reduced, and the reliability of data stored in the semiconductor memory 10 may be improved.

Further, the maximum number of blocks for the erased blocks is dynamically managed, that is, the maximum number of blocks for the erased blocks is not set to a fixed number, but is calculated based on the write characteristic information or the block transition information, the erased-state time limit, and the elapsed time information of an erased block, so that the maximum number of blocks for the erased blocks may be set to the optimal number according to the operation status. As a result, the frequency of the collision of the erase operation with the read operation and the write operation may be reduced, so that the operation performance in the memory system may be improved.

2. Second Embodiment

Next, a memory system according to a second embodiment will be described. The memory system according to the second embodiment has a multi-block erase function. The multi-block erase function is a function that executes the erase operation for multiple blocks in parallel. That is, according to the multi-block erase function, the erase operation may be executed for multiple blocks in parallel, with one erase command (e.g., a multi-block erase command for executing an erase operation for multiple blocks that share a bit line). Hereinafter, in the second embodiment, differences from the first embodiment will be mainly described.

2.1 Configuration of Memory System

Figure 15:
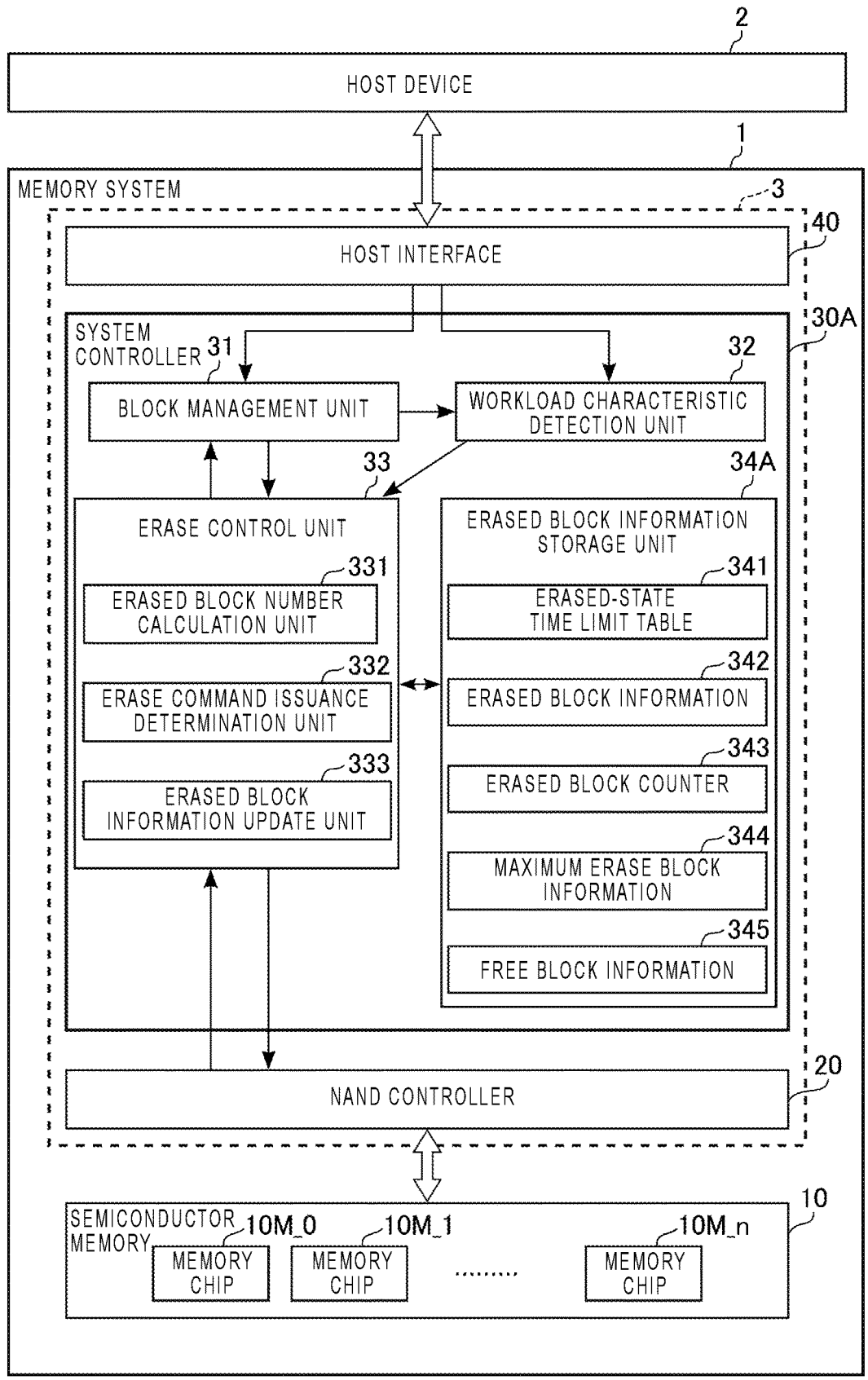
FIG. 15 is a block diagram illustrating a configuration of an information processing system including a memory system according to a second embodiment.

The configuration of the memory system according to the second embodiment will be described. FIG. 15 is a block diagram illustrating a configuration of an information processing system including the memory system according to the second embodiment. The memory system 1 includes a semiconductor memory 10, a NAND controller 20, a system controller 30A, and a host interface 40. The semiconductor memory 10, the NAND controller 20, and the host interface 40 are the same as described in the first embodiment.

2.1.1 Configuration of System Controller 30A

Hereinafter, the system controller 30A in the second embodiment will be described. As illustrated in FIG. 15, the system controller 30A includes a block management unit 31, a workload characteristic detection unit 32, an erase control unit 33, and an erased block information storage unit 34A. The block management unit 31, the workload characteristic detection unit 32, and the erase control unit 33 are the same as described in the first embodiment.

The erased block information storage unit 34A of the system controller 30A includes an erased-state time limit table 341, erased block information 342, an erased block counter 343, maximum erase block information 344, and free block information 345. The erased-state time limit table 341, the erased block information 342, and the erased block counter 343 are the same as described in the first embodiment.

The maximum erase block information 344 of the erased block information storage unit 34A includes the maximum number of blocks that may be erased in parallel (hereinafter, referred to as the maximum number of erase blocks) by a multi-block erase command. The maximum number of erase blocks is a value set in consideration of a peak power that may be used for the erase operation and the reliability related to the erase operation.

The free block information 345 includes the number of free blocks belonging to the free block pool PF.

2.2 Operation of Memory System

Figure 16:
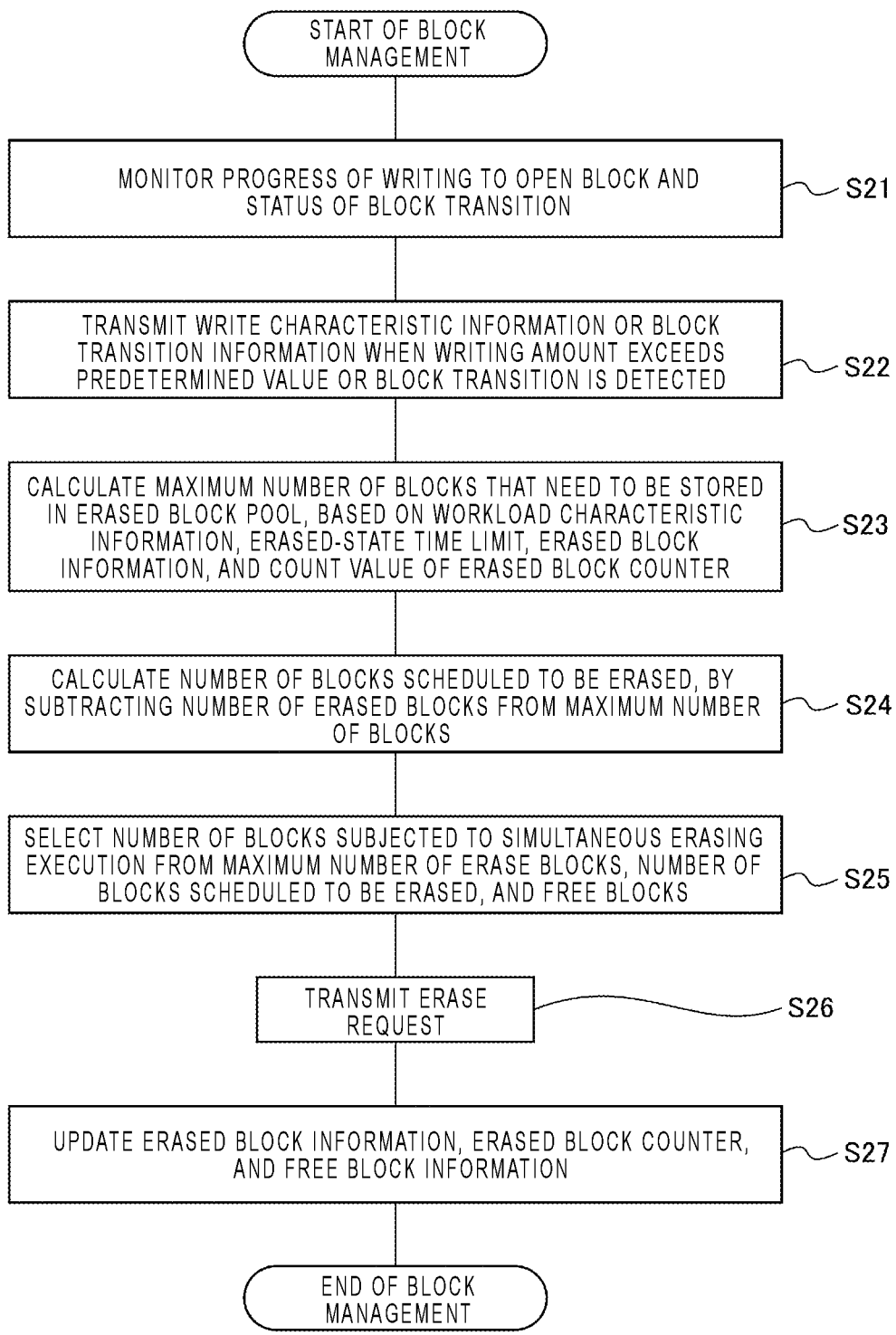
FIG. 16 is a flowchart illustrating a control of block management according to the second embodiment.

Hereinafter, the control of block management in the memory system 1 according to the second embodiment will be described. FIG. 16 is a flowchart illustrating the control of block management in the second embodiment. The control of block management is executed by the system controller 30.

In FIG. 16, steps S21 to S23 are the same as the processes of steps S11 to S13 illustrated in FIG. 7 in the first embodiment.

The workload characteristic detection unit 32 monitors the progress of writing to the open block and the status of block transition (S21).

Then, when the amount of writing to the open block exceeds a predetermined value, the workload characteristic detection unit 32 transmits write characteristic information to the erase control unit 33. Further, when a block transition from the free block pool PF to the erased block pool PE or a block transition from the written block pool PW to the free block pool PF is detected, the workload characteristic detection unit 32 transmits block transition information to the erase control unit 33 (S22).

Then, when at least one of the write characteristic information and the block transition information is received, the erased block number calculation unit 331 of the erase control unit 33 acquires the erased-state time limit from the erased-state time limit table 341, the erased block information 342, and the count value of the erased block counter 343 from the erased block information storage unit 34. The erased block number calculation unit 331 calculates the maximum number of blocks for the erased blocks that need to belong to the erased block pool PE, based on the workload characteristic information, the erased-state time limit, the erased block information 342, and the count value of the erased block counter 343 (S23).

Then, the erased block number calculation unit 331 subtracts the number of erased blocks that already belong to the erased block pool PE at the time when the maximum number of blocks is calculated, from the calculated maximum number of blocks. As a result, the erased block number calculation unit 331 calculates the number of blocks that need to be transitioned to the erased block pool PE, that is, the number of blocks that are to be transitioned from the free blocks to the erased blocks (hereinafter, referred to as the number of blocks scheduled to be erased) by executing an erasing for the free blocks (S24).

Then, the erased block number calculation unit 331 selects the smallest number of blocks among the maximum number of erase blocks in the maximum erase block information 344, the number of blocks scheduled to be erased, and the number of free blocks in the free block information 345, as the number of blocks for which an erasing needs to be executed in parallel (hereinafter, referred to as the number of blocks subjected to an erasing execution) (S25).

Then, the erase command issuance determination unit 332 in the erase control unit 33 transmits an erase request that targets the selected number of blocks subjected to an erasing execution, to the NAND controller 20 (S26). The erase request is a signal for requesting the NAND controller 20 to issue the multi-block erase command. When the erase request is received, the NAND controller 20 issues the multi-block erase command to the semiconductor memory 10. When the multi-block erase command is received, the semiconductor memory 10 executes an erasing for the multiple free blocks of the erasing target in parallel. As described above, the memory system of the second embodiment has the multi-block erase function. In the multi-block erase function, when the erasing target is multiple blocks, the erasing is executed in a parallel manner for multiple blocks.

Then, when the erasing of the multiple blocks in the semiconductor memory 10 is completed, the erased block information update unit 333 in the erase control unit 33 receives an erase completion notification from the NAND controller 20. When the erase completion notification is received, the erased block information update unit 333 updates the erased block information 342 in the erased block information storage unit 34, the count value of the erased block counter 343, and the free block information 345 (S27). Then, the system controller 30 ends the control of block management.

2.3 Effects of Second Embodiment

According to the second embodiment, it is possible to provide the memory system with improved reliability and operation performance as in the first embodiment.

The second embodiment has the following effects, in addition to the effects of the first embodiment.

The memory system according to the second embodiment has the multi-block erase function. With the multi-block erase function, multiple blocks may be erased in parallel, with one erase command. In the second embodiment, since multiple blocks may be erased in parallel, the time required for the erase operation may be reduced.

Further, the number of blocks to be erased in parallel is dynamically managed, that is, the number of blocks to be erased in parallel is not set to a fixed number but is selected from the maximum number of erase blocks, the number of blocks scheduled to be erased, and the number of free blocks, so that the number of blocks to be erased in parallel may be set to the optimum number according to the operation status. As a result, the frequency of the erase operation with the read operation and the write operation may be reduced, so that the operation performance in the memory system may be improved.

3. Third Embodiment

Next, a memory system according to a third embodiment will be described. In the third embodiment, descriptions will be made on a method of constructing the blocks of the semiconductor memory 10 that correspond to a logical block, for erasing multiple blocks in parallel. In the third embodiment, differences from the second embodiment will be mainly described.

3.1 Configuration of NAND Controller 20 and Semiconductor Memory 10

Figure 17:
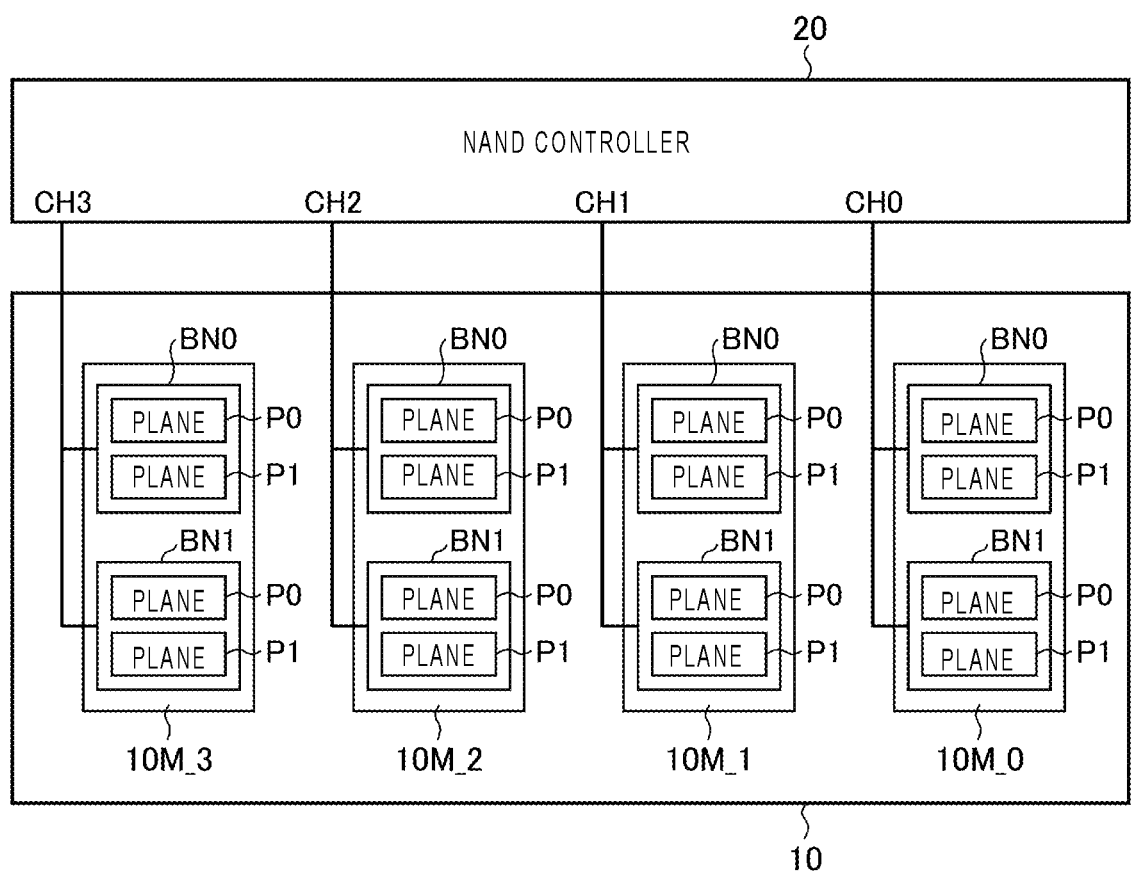
FIG. 17 is a block diagram illustrating a configuration of a NAND controller and a semiconductor memory according to a third embodiment.

FIG. 17 is a block diagram illustrating the configuration of the NAND controller 20 and the semiconductor memory 10 according to the third embodiment. Here, for the convenience of descriptions, it is assumed that the semiconductor memory 10 includes four memory chips 10M_0 to 10M_3, each memory chip includes two banks BN0 and BN1, each bank includes two planes P0 and P1, and each plane includes eight blocks BLK0 to BLK7.

As illustrated in FIG. 17, for example, the NAND controller 20 includes four channels CH0, CH1, CH2, and CH3. The memory chips 10M_0 to 10M_3 are connected to the channels CH0 to CH3, respectively. Each of the memory chips 10M_0 to 10M_3 includes the banks BN0 and BN1. Each of the banks BN0 and BN1 includes the planes P0 and P1. Each of the planes P0 and P1 includes the blocks BLK0 to BLK7.

Hereinafter, an example of the connection of the blocks in a plane of the memory chip will be described.

Figure 18:
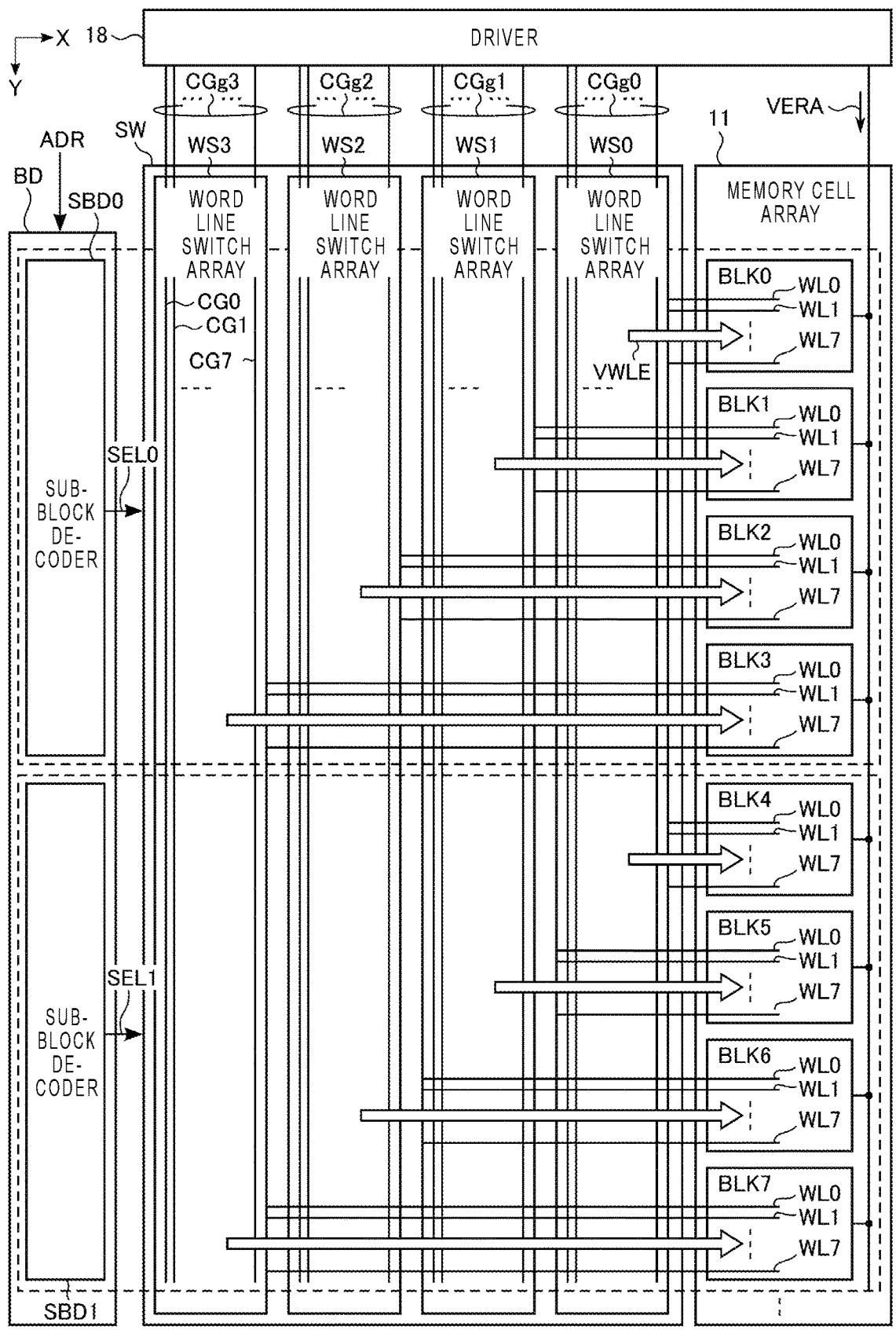
FIG. 18 is a diagram illustrating an example of a connection of blocks in a plane of a memory chip in the third embodiment.

FIG. 18 is a diagram illustrating an example of the connection of the blocks BLK0 to BLK7 in the plane P0 of the memory chip. The plane P0 includes a memory cell array 11, a block decoder BD, a switch circuit SW, and a driver 18. The memory cell array 11 includes the blocks BLK0 to BLK7. The row decoder 19 illustrated in FIG. 3 includes the block decoder BD and the switch circuit SW.

The blocks BLK0 to BLK7 in the memory cell array 11 are arranged in the Y direction. The block decoder BD is disposed in the X direction of the blocks BLK0 to BLK7. The block decoder BD includes sub-block decoders SBD0 and SBD1 arranged in the Y direction. The sub-block decoder SBD0 is associated with the blocks BLK0 to BLK3. The sub-block decoder SBD1 is associated with the blocks BLK4 to BLK7.

The sub-block decoder SBD0 sets the blocks BLK0 to BLK3 to the selected state or the non-selected state, based on a block address ADR. The sub-block decoder SBD1 sets the blocks BLK4 to BLK8 to the selected state or the non-selected state, based on the block address ADR.

The switch circuit SW is disposed between the blocks BLK0 to BLK7 and the sub-block decoders SBD0 and SBD1. The switch circuit SW includes word line switch arrays WS0, WS1, WS2, and WS3 arranged in the X direction. The driver 18 is disposed in the Y direction of the word line switch arrays WS0 to WS3.

Signal line groups CGg0, CGg1, CGg2, and CGg3 are connected to the driver 18. Each of the signal line groups CGg0 to CGg3 includes signal lines CG0, CG1, . . . , and CG7. The driver 18 drives the signal lines CG0 to CG7 in each of the signal line groups CGg0 to CGg3.

Each of the word line switch arrays WS0 to WS3 includes multiple switch transistors. The signal line groups CGg0 to CGg3 are connected to the blocks BLK0 to BLK3, respectively, via the word line switch arrays WS0 to WS3, respectively. Specifically, the signal lines CG0 to CG7 in the signal line group CGg0 are connected to the word lines WL0 to WL7, respectively, in the block BLK0 via the switch transistors in the word line switch array WS0. The signal lines CG0 to CG7 in the signal line group CGg1 are connected to the word lines WL0 to WL7, respectively, in the block BLK1 via the switch transistors in the word line switch array WS1. The signal lines CG0 to CG7 in the signal line group CGg2 are connected to the word lines WL0 to WL7, respectively, in the block BLK2 via the switch transistors in the word line switch array WS2. The signal lines CG0 to CG7 in the signal line group CGg3 are connected to the word lines WL0 to WL7, respectively, in the block BLK3 via the switch transistors in the word line switch array WS3.

Some of the multiple switch transistors in the word line switch array WS0 perform switching of the connected state and the non-connected state between the signal lines CG0 to CG7 in the signal line group CGg0 and the word lines WL0 to WL7 in the block BLK0, according to a selection signal SEL0 from the sub-block decoder SBD0. For example, a switch transistor connects or disconnects the signal line CG0 and the word line WL0 according to the selection signal SEL0. Another switch transistor connects or disconnects the signal line CG1 and the word line WL1 according to the selection signal SEL0.

Some of the multiple switch transistors in the word line switch array WS1 perform switching of the connected state and the non-connected state between the signal lines CG0 to CG7 in the signal line group CGg1 and the word lines WL0 to WL7 in the block BLK1, according to the selection signal SEL0 from the sub-block decoder SBD0.

Some of the multiple switch transistors in the word line switch array WS2 perform switching of the connected state or non-connected state between the signal lines CG0 to CG7 in the signal line group CGg2 and the word lines WL0 to WL7 in the block BLK2, according to the selection signal SEL0 from the sub-block decoder SBD0.

Some of the multiple switch transistors in the word line switch array WS3 perform switching of the connected state and the non-connected state between the signal lines CG0 to CG7 in the signal line group CGg3 and the word lines WL0 to WL7 in the block BLK3, according to the selection signal SEL0 from the sub-block decoder SBD0.

The other multiple switch transistors in the word line switch array WS0 perform switching of the connected state and the non-connected state between the signal lines CG0 to CG7 in the signal line group CGg0 and the word lines WL0 to WL7 in the block BLK4, according to a selection signal SEL1 from the sub-block decoder SBD1. For example, a switch transistor connects or disconnects the signal line CG0 and the word line WL0 according to the selection signal SEL1. Another switch transistor connects or disconnects the signal line CG1 and the word line WL1 according to the selection signal SEL1.

The other multiple switch transistors in the word line switch array WS1 performs switching of the selected state and the non-selected state between the signal lines CG0 to CG7 in the signal line group CGg1 and the word lines WL0 to WL7 in the block BLK5, according to the selection signal SEL1 from the sub-block decoder SBD1.

The other multiple switch transistors in the word line switch array WS2 perform switching of the connected state and the non-connected state between the signal lines CG0 to CG7 in the signal line group CGg2 and the word lines WL0 to WL7 in the block BLK6, according to the selection signal SEL1 from the sub-block decoder SBD1.

The other multiple switch transistors in the word line switch array WS3 perform switching of the connected state and the non-connected state between the signal lines CG0 to CG7 in the signal line group CGg3 and the word lines WL0 to WL7 in the block BLK7, according to the selection signal SEL1 from the sub-block decoder SBD1.

The driver 18 supplies an operation voltage to the word lines WL in a selected block BLK via the signal lines CG0 to CG7 in the signal line groups CGg0 to CGg3 and the switch transistors in the word line switch arrays WS0 to WS3. For example, during the erase operation, the driver 18 supplies a voltage VWLE to the word lines WL in an erasing target block. The voltage VWLE is, for example, equal to or higher than a voltage VSS and lower than an erase voltage VERA. Without being limited thereto, the voltage VWLE may be lower than the voltage VSS. Meanwhile, the driver 18 supplies a voltage higher than the voltage VWLE to the word lines WL in a block that is not erased.

Hereinafter, another example of the connection of the blocks in the plane P0 of the memory chip will be described.

Figure 19:
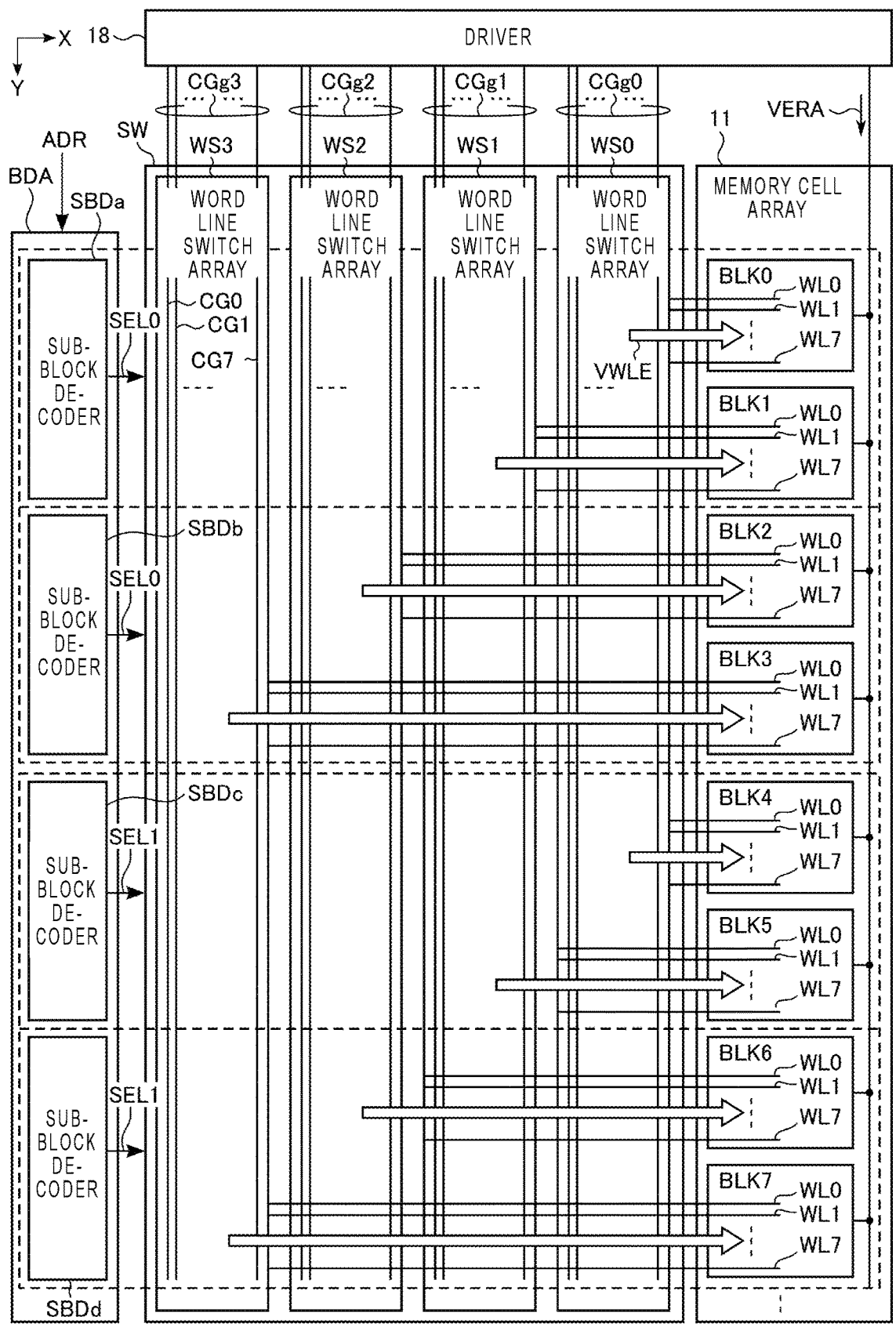
FIG. 19 is a diagram illustrating another example of the connection of blocks in the plane of the memory chip in the third embodiment.

FIG. 19 is a diagram illustrating another example of the connection of the blocks BLK0 to BLK7 in the plane P0 of the memory chip. The plane P0 includes a memory cell array 11, a block decoder BDA, a switch circuit SW, and a driver 18. The memory cell array 11, the switch circuit SW, and the driver 18 have the same configuration as illustrated in FIG. 18.

The block decoder BDA includes sub-block decoders SBDa, SBDb, SBDc, and SBDd arranged in the Y direction. The sub-block decoder SBDa is associated with the blocks BLK0 and BLK1. The sub-block decoder SBDb is associated with the blocks BLK2 and BLK3. The sub-block decoder SBDc is associated with the blocks BLK4 and BLK5. The sub-block decoder SBDd is associated with the blocks BLK6 and BLK7.

The sub-block decoder SBDa sets the blocks BLK0 and BLK1 to the selected state or the non-selected state based on the block address ADR. The sub-block decoder SBDb sets the blocks BLK2 and BLK3 to the selected state or the non-selected state based on the block address ADR. The sub-block decoder SBDc sets the blocks BLK4 and BLK5 to the selected state or the non-selected state based on the block address ADR. The sub-block decoder SBDd sets the blocks BLK6 and BLK7 to the selected state or the non-selected state based on the block address ADR.

Some of the multiple switch transistors in the word line switch array WS0 perform switching of the selected state and the non-selected state between the signal lines CG0 to CG7 in the signal line group CGg0 and the word lines WL0 to WL7 in the block BLK0, according to the selection signal SEL0 from the sub-block decoder SBDa. For example, a switch transistor connects or disconnects the signal line CG0 and the word line WL0 according to the selection signal SEL0. Another switch transistor connects or disconnects the signal line CG1 and the word line WL1 according to the selection signal SEL0.

Some of the multiple switch transistors in the word line switch array WS1 perform switching of the connected state and the non-connected state between the signal lines CG0 to CG7 in the signal line group CGg1 and the word lines WL0 to WL7 in the block BLK1, according to the selection signal SEL0 from the sub-block decoder SBDa.

Some of the multiple switch transistors in the word line switch array WS2 perform switching of the connected state and the non-connected state between the signal lines CG0 to CG7 in the signal line group CGg2 and the word lines WL0 to WL7 in the block BLK2, according to the selection signal SEL0 from the subblock decoder SBDb.

Some of the multiple switch transistors in the word line switch array WS3 perform switching of the connected state and the non-connected state between the signal lines CG0 to CG7 in the signal line group CGg3 and the word lines WL0 to WL7 in the block BLK3, according to the selection signal SEL0 from the sub-block decoder SBDb.

Further, the other multiple switch transistors in the word line switch array WS0 perform switching of the selected state and the non-selected state between the signal lines CG0 to CG7 in the signal line group CGg0 and the word lines WL0 to WL7 in the block BLK4, according to the selection signal SEL1 from the sub-block decoder SBDc.

The other multiple switch transistors in the word line switch array WS1 perform switching of the selected state and the non-selected state between the signal lines CG0 to CG7 in the signal line group CGg1 and the word lines WL0 to WL7 in the block BLK5, according to the selection signal SEL1 from the sub-block decoder SBDc.

The other multiple switch transistors in the word line switch array WS2 perform switching of the selected state and the non-selected state between the signal lines CG0 to CG7 in the signal line group CGg2 and the word lines WL0 to WL7 in the block BLK6, according to the selection signal SEL1 from the sub-block decoder SBDd.

The other multiple switch transistors in the word line switch array WS3 perform switching of the selected state and the non-selected state between the signal lines CG0 to CG7 in the signal line group CGg3 and the word lines WL0 to WL7 in the block BLK7, according to the selection signal SEL1 from the sub-block decoder SBDd.

The driver 18 supplies an operation voltage to the word lines WL in a selected block BLK via the signal lines CG0 to CG7 in the signal line group CGg0 to CGg3 and the switch transistors in the word line switch arrays WS0 to WS3. For example, during the erase operation, the driver 18 supplies the voltage VWLE to the word lines WL in the erasing target block. As described above, the voltage VWLE is, for example, equal to or higher than the voltage VSS and lower than the erase voltage VERA. The voltage VWLE may be lower than the voltage VSS. Meanwhile, the driver 18 supplies a voltage higher than the voltage VWLE to the word lines WL in a block that is not erased.

While the connection of the blocks in the plane P0 of the memory chip has been described, the connection of the blocks in the plane P1 is the same as the connection illustrated in FIG. 18 or 19. Further, in the descriptions above, the four memory chips 10M_0 to 10M_3 are connected to the NAND controller 20, each of the memory chips includes the two banks BN0 and BN1, and each of the banks includes the two planes P0 and P1. However, the number of memory chips connected to the NAND controller 20, the number of banks in each of the memory chips, the number of planes in each of the banks, and the number of blocks in each of the planes may be set to any value.

3.2 Operation of Memory System

In the third embodiment, the multi-block erase command is issued to the semiconductor memory 10, so as to erase data in the multiple blocks in parallel. When the blocks BLK0 to BLK7, the block decoder BD, the switch circuit SW, and the driver 18 in the memory chip of the semiconductor memory 10 are configured as illustrated in FIG. 18 or 19, logical blocks and physical blocks are associated with each other as described herein below, in order to erase the multiple blocks in parallel. The logical blocks are managed by the system controller 30. The physical blocks are the blocks BLK0 to BLK7 in the memory chip of the semiconductor memory 10.

FIG. 20 is an example of a table representing the correspondence between the logical blocks and the physical blocks in the memory system 1 according to the third embodiment. The memory chip 10M_0 connected to the channel CH0 includes the banks BN0 and BN1, and each of the banks BN0 and BN1 includes the planes P0 and P1. Similarly, the memory chip 10M_1 connected to the channel CH1 includes the banks BN0 and BN1, and each of the banks BN0 and BN1 includes the planes P0 and P1. The blocks BLK0 to BLK7, which are physical blocks, in the planes P0 and P1 are indicated by 0 to 7, respectively. The addresses of the logical blocks are indicated by MBA0, MBA1, . . . , and MBA7, respectively.

As illustrated in FIG. 20, a logical block is configured with multiple physical blocks sharing each of the word line switch arrays WS0 to WS3. That is, a logical block is configured with multiple blocks BLK connected to one word line switch array. For example, the logical block indicated by the address MBA0 is configured with the blocks BLK0 and BLK4 connected to the word line switch array WS0. The logical block indicated by the address MBA1 is configured with the blocks BLK1 and BLK5 connected to the word line switch array WS1. The logical block indicated by the address MBA2 is configured with the blocks BLK2 and BLK6 connected to the word line switch array WS2. The logical block indicated by the address MBA3 is configured with the blocks BLK3 and BLK7 connected to the word line switch array WS3.

Similarly, the logical block indicated by the address MBA4 is configured with the blocks BLK0 and BLK4 connected to the word line switch array WS0. The logical block indicated by the address MBA5 is configured with the blocks BLK1 and BLK5 connected to the word line switch array WS1. The logical block indicated by the address MBA6 is configured with the blocks BLK2 and BLK6 connected to the word line switch array WS2. The logical block indicated by the address MBA7 is configured with the blocks BLK3 and BLK7 connected to the word line switch array WS3.

By configuring a logical block in this way, for example, the blocks BLK0 and BLK4 associated with the logical block indicated by the address MBA0 may be erased in parallel. Similarly, the blocks BLK1 and BLK5 associated with the address MBA1 may be erased in parallel.

Further, as another example for associating the logical blocks and the physical blocks, the addresses MBA0 to MBA7 and the blocks BLK0 to BLK7 may be associated with each other as follows.

FIG. 21 is another example of the table representing the correspondence between the logical blocks and the physical blocks in the memory system 1 according to the third embodiment. Similar to FIG. 20, the memory chip 10M_0 connected to the channel CH0 includes the banks BN0 and BN1, and each of the banks BN0 and BN1 includes the planes P0 and P1. The memory chip 10M_1 connected to the channel CH1 includes the banks BN0 and BN1, and each of the banks BN0 and BN1 includes the planes P0 and P1.

Further, in the configuration illustrated in FIG. 18, the block decoder group G0 includes the sub-block decoder SBD0, and the block decoder group G1 includes the sub-block decoder SBD1. In the configuration illustrated in FIG. 19, the block decoder group G0 includes the sub-block decoders SBDa and SBDb, and the block decoder group G1 includes the sub-block decoders SBDc and SBDd.

As illustrated in FIG. 21, the logical blocks indicated by the addresses MBA0 to MBA3 or MBA4 to MBA7 are configured with the multiple physical blocks sharing the block decoder group G0 or G1. That is, the group of logical blocks to be erased in parallel is configured with the multiple blocks BLK connected to one block decoder group.

For example, as illustrated in FIG. 18, when the four word line switch arrays WS0 to WS3 are provided, the sub-block decoders SBD0 and SBD1 associated with the word line switch arrays WS0 to WS3 are set as the block decoder groups G0 and G1, respectively.

With this setting, as illustrated in FIG. 21, the logical blocks indicated by the addresses MBA0 to MBA3 are selected from the blocks BLK0 to BLK3 by the block decoder group G0. Alternatively, the logical blocks of the addresses MBA0 to MBA3 are selected from the blocks BLK4 to BLK7 by the block decoder group G1.

The logical blocks indicated by the addresses MBA4 to MBA7 are selected from the blocks BLK4 to BLK7 by the block decoder group G1. Alternatively, the logical blocks of the addresses MBA4 to MBA7 are selected from the blocks BLK0 to BLK3 by the block decoder group G0.

By configuring the logical blocks in this way, for example, the blocks BLK0 to BLK3 or BLK4 to BLK7 associated with the logical blocks indicated by the addresses MBA0 to MBA3 may be erased in parallel. Similarly, the blocks BLK4 to BLK7 or BLK0 to BLK3 associated with the logical block indicated by the addresses MBA4 to MBA7 may be erased in parallel.

3.3 Effects of Third Embodiment

According to the third embodiment, it is possible to provide the memory system with improved reliability and operation performance as in the second embodiment. That is, the reliability of data stored in the semiconductor memory 10 may be improved. Further, the operation performance in the memory system may be improved.

4. Fourth Embodiment

Next, a memory system according to a fourth embodiment will be described. In the fourth embodiment, a method of managing logical blocks in order to maximize (or optimize) the number of blocks to be erased in parallel will be described. In the fourth embodiment, differences from the second embodiment will be mainly described.

4.1 Configuration of Memory System

Figure 22:
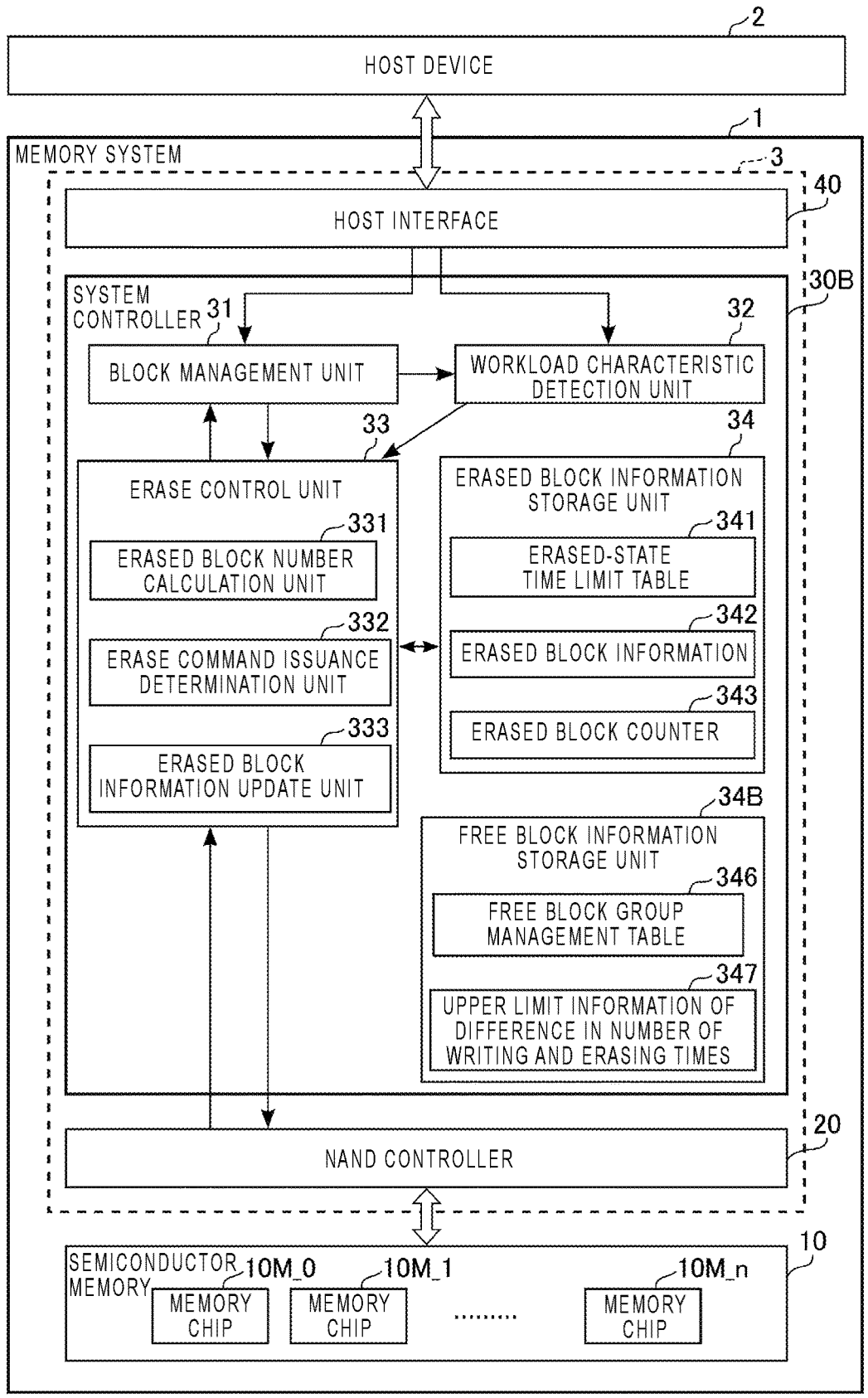
FIG. 22 is a block diagram illustrating a configuration of an information processing system including a memory system according to a fourth embodiment.

The configuration of the memory system according to the fourth embodiment will be described. FIG. 22 is a block diagram illustrating a configuration of an information processing system including the memory system according to the fourth embodiment. The memory system 1 includes a semiconductor memory 10, a NAND controller 20, a system controller 30B, and a host interface 40. The semiconductor memory 10, the NAND controller 20, and the host interface 40 are the same as described in the first embodiment.

4.1.1 Configuration of System Controller 30B

Hereinafter, the system controller 30B in the fourth embodiment will be described. As illustrated in FIG. 22, the system controller 30B includes a block management unit 31, a workload characteristic detection unit 32, an erase control unit 33, an erased block information storage unit 34, and a free block information storage unit 34B. The block management unit 31, the workload characteristic detection unit 32, the erase control unit 33, and the erased block information storage unit 34 are the same as described in the first embodiment.

The free block information storage unit 34B provided in the system controller 30B includes a free block group management table 346 and upper limit information 347 of a difference in the number of writing and erasing times.

The free block group management table 346 includes a first table representing the number of free blocks corresponding to each word line switch array as illustrated in FIG. 23, or a second table representing the number of free blocks corresponding to each block decoder group as illustrated in FIG. 24.

FIG. 23 is an example of the first table representing the number of free blocks corresponding to each word line switch array. The first table represents the number of free blocks that correspond to each of the word line switch arrays WS0 to WS3 among the free blocks belonging to the free block pool FP. Further, the first table represents an average value of the number of times the writing and the erasing have been executed for the free blocks of each of the word line switch arrays WS0 to WS3.

FIG. 24 is an example of the second table representing the number of free blocks corresponding to each block decoder group. The second table represents the number of free blocks that correspond to each of the block decoder groups G0 to G5 among the free blocks belonging to the free block pool FP. Further, the second table represents an average value of the number of times the writing and the erasing have been executed for the free blocks of each of the block decoder groups G0 to G5.

The upper limit information 347 of the difference in the number of writing and erasing times includes an upper limit of the difference between the average values of the number of writing and erasing times in the first and second tables.

4.2 Operation of Memory System

Figure 25:
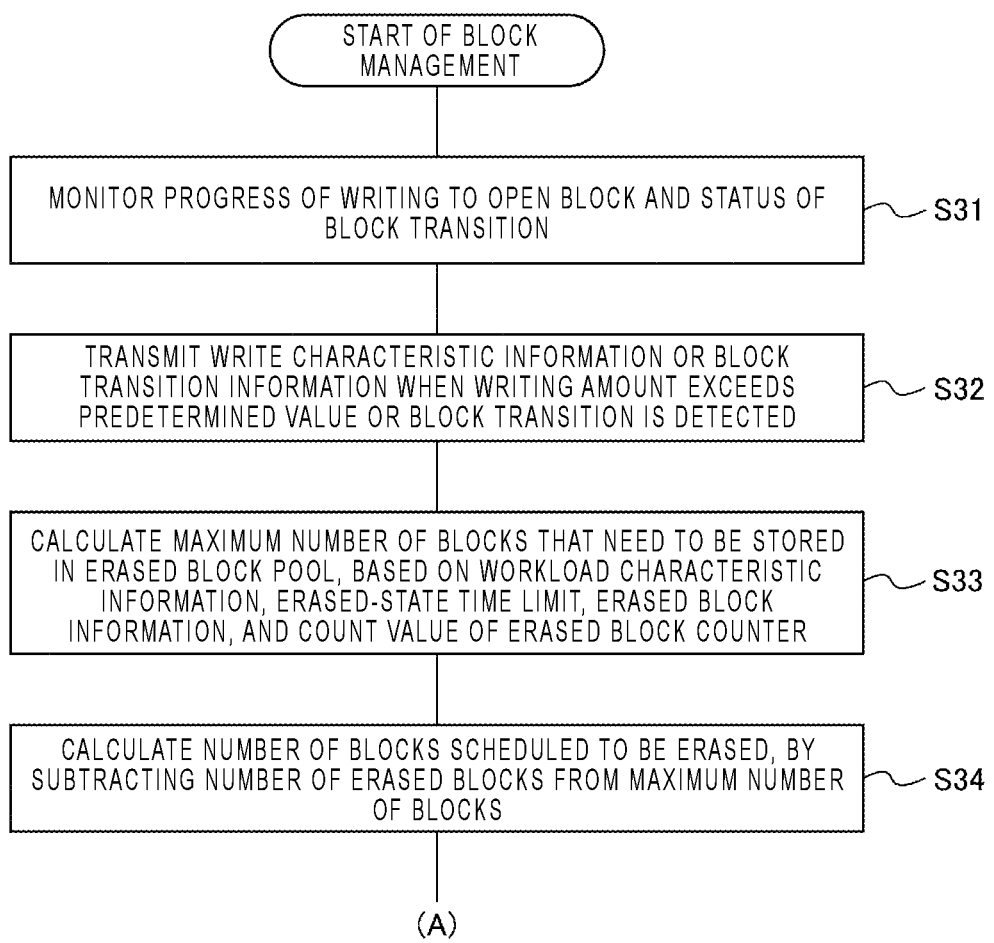
FIGS. 25 and 26 are flowcharts illustrating a control of block management according to the fourth embodiment.
Figure 26:
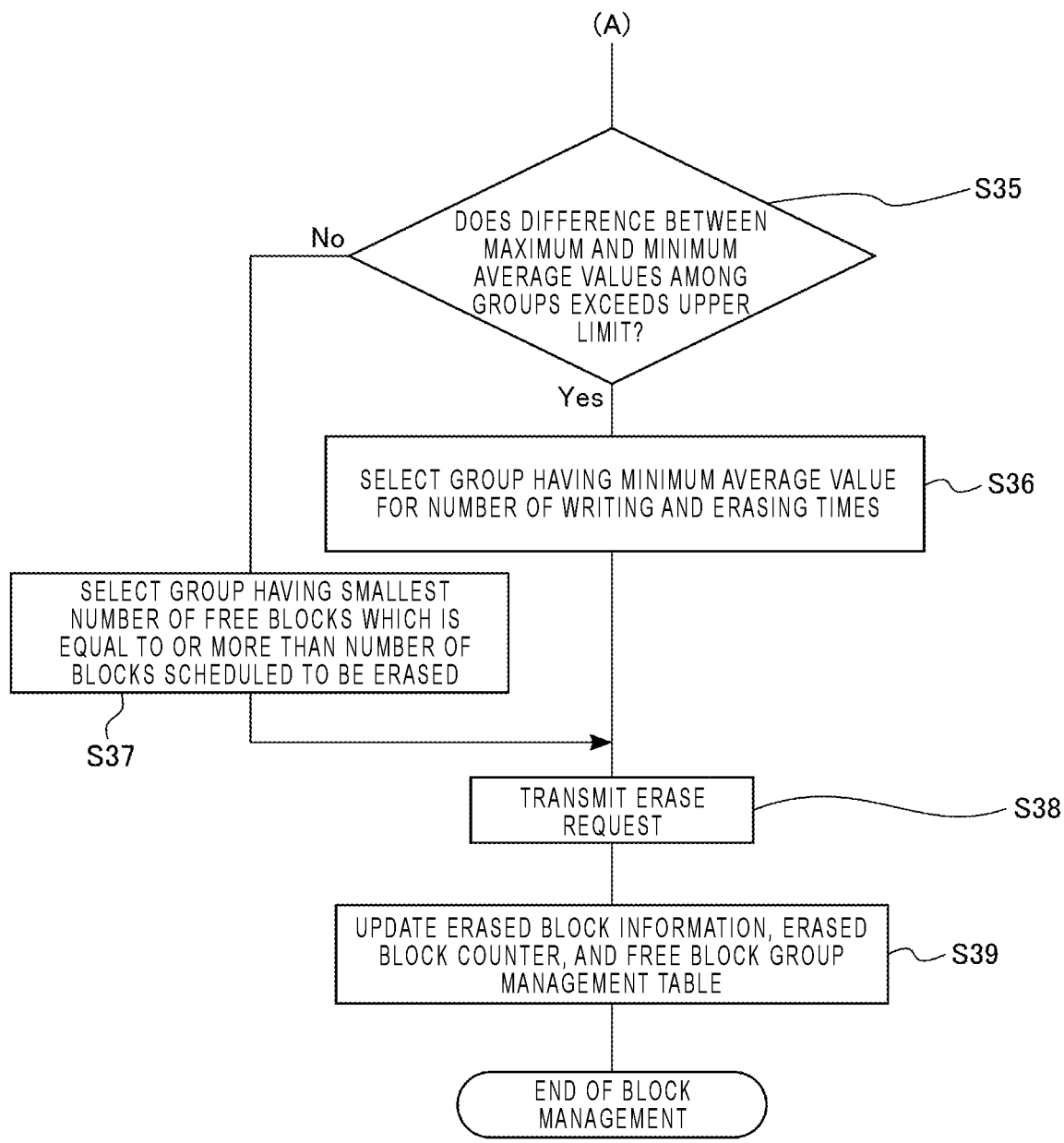

Hereinafter, the control of block management in the memory system 1 according to the fourth embodiment will be described. FIGS. 25 and 26 are flowcharts representing the control of block management in the fourth embodiment. The control of block management is executed by the system controller 30.

In FIG. 25, steps S31 to S34 are the same as the processes of steps S21 to S24 illustrated in FIG. 16 in the second embodiment.

The workload characteristic detection unit 32 monitors the progress of writing to the open blocks and the status of block transition (S31).

Then, when the amount of writing to the open blocks exceeds a predetermined value, the workload characteristic detection unit 32 transmits the write characteristic information to the erase control unit 33. Further, when a block transition from the free block pool PF to the erased block pool PE or a block transition from the written block pool PW to the free block pool PF is detected, the workload characteristic detection unit 32 transmits the block transition information to the erase control unit 33 (S32).

Then, when at least one of the write characteristic information and the block transition information is received, the erased block number calculation unit 331 acquires the erased-state time limit from the erased-state time limit table 341, the erased block information 342, and the count value of the erased block counter 343. The erased block number calculation unit 331 calculates the maximum number of blocks for the erased blocks that need to belong to the erased block pool PE, based on the workload characteristic information, the erased-state time limit, the erased block information 342, and the count value of the erased block counter 343 (S33).

Then, the erased block number calculation unit 331 subtracts the number of erased blocks that already belong to the erased block pool PE at the time when the maximum number of blocks is calculated, from the calculated maximum number of blocks. As a result, the erased block number calculation unit 331 calculates the number of blocks that need to be transitioned to the erased block pool PE, that is, the number of blocks that are to be transitioned from the free blocks to the erased blocks (the number of blocks scheduled to be erased) by executing an erasing for the free blocks (S34).

Then, as illustrated in FIG. 26, the erased block number calculation unit 331 determines whether the difference between the maximum average value and the minimum average value among the average values for the number of writing and erasing times in the free blocks included in the respective groups of the word line switch arrays WS0 to WS3 or the respective block decoder groups G0 to G5 exceeds the upper limit in the upper limit information 347, from the information provided in the free block group management table 346 (S35). When it is determined that the difference between the maximum average value and the minimum average value exceeds the upper limit (Yes in S35), a group having the minimum average value for the number of writing and erasing times is selected from the respective groups of the word line switch arrays WS0 to WS3 or the respective block decoder groups G0 to G5 (S36). Further, when the number of free blocks in the selected group is smaller than the number of blocks scheduled to be erased, a group having the next minimum average number for the number of writing and erasing times is sequentially selected. Meanwhile, when it is determined that the difference between the maximum average value and the minimum average value does not exceed the upper limit (No in S35), a group including the smallest number of free blocks which is equal to or more than the number of blocks scheduled to be erased is selected from the respective groups of the word line switch arrays WS0 to WS3 or the respective block decoder groups G0 to G5 (S37).

Then, the erase command issuance determination unit 332 in the erasure control unit 33 transmits an erase request for erasing the blocks of the selected group, to the NAND controller 20 (S38). The erase request is a signal for requesting the NAND controller 20 to issue the multi-block erase command. When the multi-block erase command is received, the semiconductor memory 10 executes an erasing for the multiple free blocks of the erasing target in parallel.

Then, when the erasing of the multiple blocks in the semiconductor memory 10 is completed, the erased block information update unit 333 in the erase control unit 33 receives an erase completion notification from the NAND controller 20. When the erase completion notification is received, the erased block information update unit 333 updates the erased block information 342 in the erased block information storage unit 34, the count value of the erased block counter 343, and the free block group management table 346 in the free block information storage unit 34B (S39). Then, the system controller 30 ends the control of block management.

4.3 Effects of Fourth Embodiment

According to the fourth embodiment, it is possible to provide the memory system with improved reliability and operation performance as in the second embodiment. That is, the reliability of data stored in the semiconductor memory 10 may be improved. Further, the operation performance in the memory system may be improved.

5. Fifth Embodiment

Next, an information processing system according to a fifth embodiment will be described. In the fifth embodiment, multiple erase requests transmitted from the host device 2 are integrated and set as one or multiple multi-block erase commands. As a result, multiple blocks are erased in parallel. In the fifth embodiment, differences from the second embodiment will be mainly described.

5.1 Configuration of Information Processing System

Figure 27:
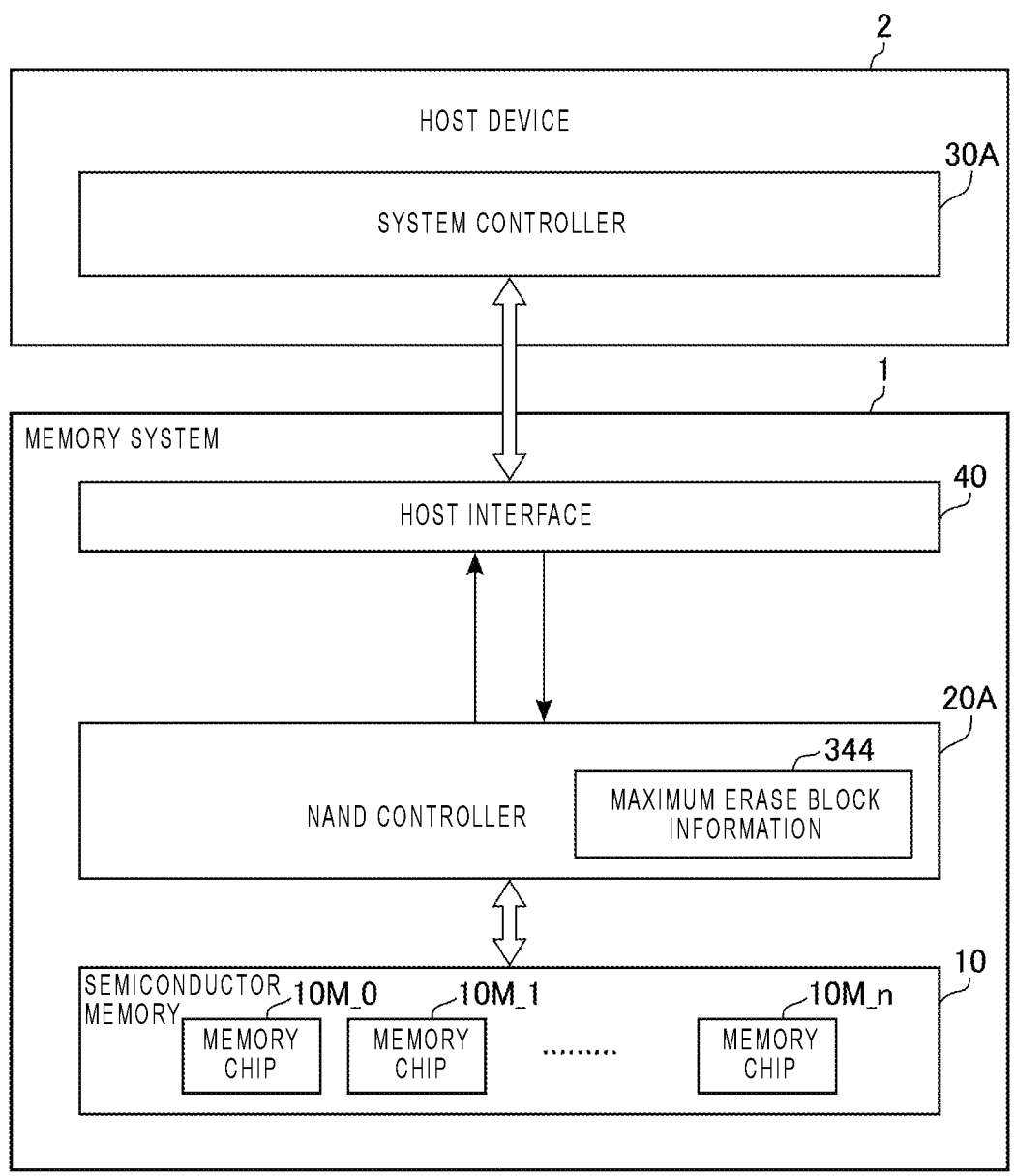
FIG. 27 is a block diagram illustrating a configuration of an information processing system according to a fifth embodiment.

FIG. 27 is a block diagram illustrating the configuration of the information processing system according to the fifth embodiment. The information processing system includes a memory system 1 and a host device 2. The host device 2 includes a system controller 30A. The system controller 30A is the same as described in the second embodiment.

The memory system 1 includes a semiconductor memory 10, a NAND controller 20A, and a host interface 40. The semiconductor memory 10 and the host interface 40 are the same as described in the second embodiment.

Figure 28:
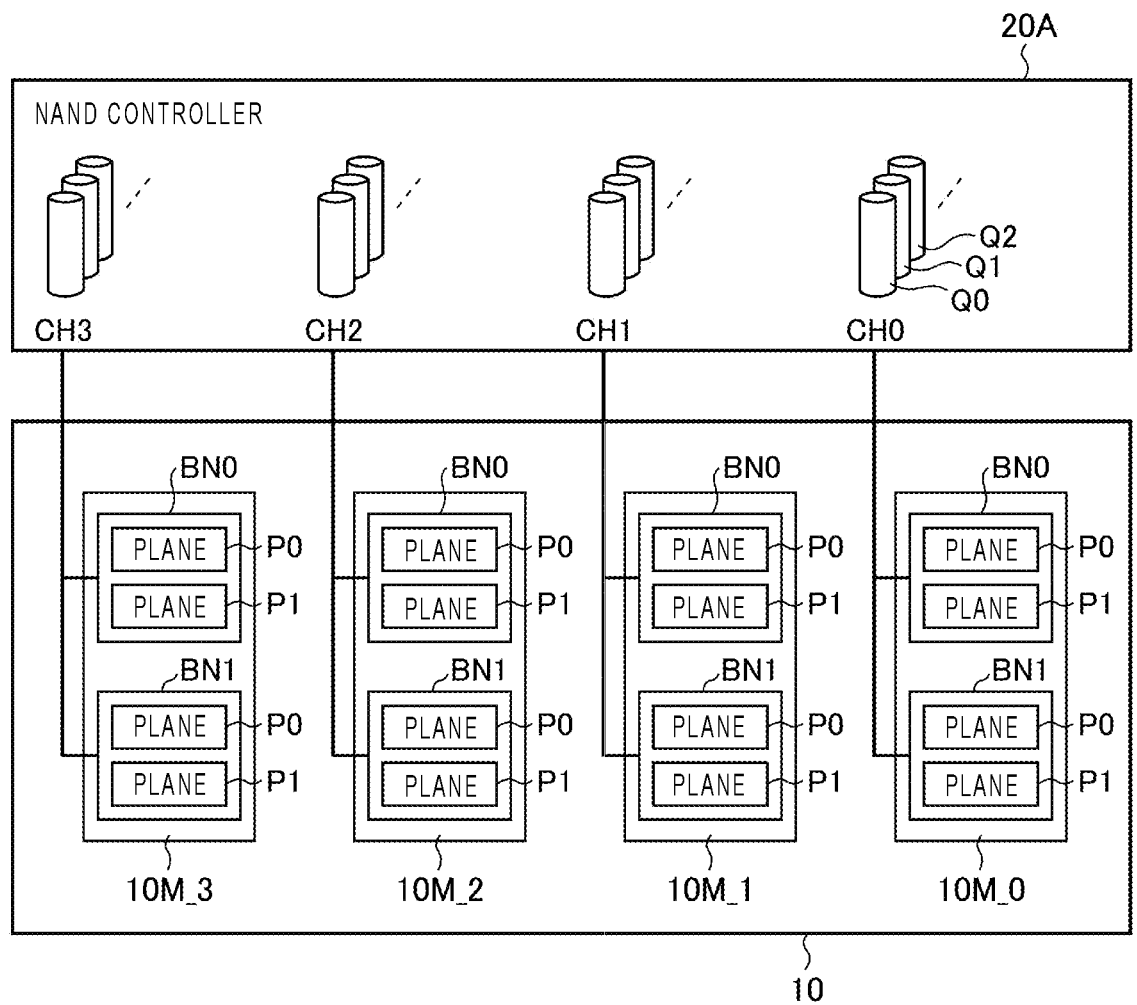
FIG. 28 is a block diagram illustrating a configuration of a NAND controller and a semiconductor memory according to the fifth embodiment.

Hereinafter, the NAND controller 20A in the fifth embodiment will be described. FIG. 28 is a block diagram illustrating the configuration of the NAND controller 20A and the semiconductor memory 10 in the fifth embodiment.

The NAND controller 20A includes channels CH0 to CH3. The channels CH0 to CH3 are connected to the memory chips 10M_0 to 10M_3, respectively. in the semiconductor memory 10. Each of the channels CH0 to CH3 includes multiple queues Q0, Q1, and Q2. For example, the queue Q0 stores read requests transmitted from the host device 2. The queue Q1 stores write requests transmitted from the host device 2. The queue Q2 stores erase requests transmitted from the host device 2. Further, each of the channels CH0 to CH3 includes a queue (not illustrated) that stores write requests generated by the garbage collection or the like, read requests, requests having various priorities and others.

5.2 Operation of Information Processing System

Hereinafter, the operation of the information processing system according to the fifth embodiment will be described.

First, a read request, a write request, and an erase request are transmitted from the host device 2 to the NAND controller 20A via the host interface 40.

Then, the NAND controller 20A sequentially stores the requests in the queue Q0, Q1 or Q2 of one of the channels CH0 to CH3 according to the attributes of the requests received from the host device 2. For example, the read request is stored in the queue Q0. The write request is stored in the queue Q1. The erase request is stored in the queue Q2. The erase request is assigned with information indicating one of the word line switch arrays WS0 to WS3 or one of the block decoder groups G0 to G5.

Then, when multiple erase requests are stored in the queue Q2, the NAND controller 20A scans the queue Q2 to see whether the multiple erase requests stored in the queue Q2 include requests that may be merged with each other. That is, the NAND controller 20A determines whether the blocks by the multiple erase requests may or may not be merged as blocks that may be erased in parallel, based on the maximum number of erase blocks in the maximum erase block information 344 and the information indicating the word line switch arrays or the block decoder groups assigned to the erase requests.

When the multiple erase requests may be merged, the NAND controller 20A stores a multi-block erase command for erasing the blocks to be erased by the multiple erase requests that may be merged, in the queue Q2. Then, the merged multiple erase requests are deleted.

Here, the NAND controller 20A includes the queues Q0 to Q2, and performs the process of merging the multiple erase requests queued in the queue Q2. However, the present disclosure is not limited thereto, and the circuit for providing queues and the circuit for performing the process of merging erase requests may be any of the circuits provided between the host device 2 and the semiconductor memory 10.

5.3 Effects of Fifth Embodiment

According to the fifth embodiment, it is possible to provide the information processing system with improved reliability and operation performance. That is, the reliability of data stored in the semiconductor memory 10 of the information processing system may be improved. Further, the operation performance in the information processing system may be improved. The details of the effects of the fifth embodiment are the same as described in the second embodiment.

In the information processing system according to the fifth embodiment, multiple erase requests are received from the host device 2, and set the multiple erase requests as one multi-block erase command, based on the word line switch arrays or the block decoder groups assigned to the erase requests. As a result, the erase operation may be executed for multiple blocks in parallel, so that the time required for the erase operation may be reduced.

6. Other Modifications

In the flowcharts of the embodiments described above, the sequence of processes may be changed. The functional blocks may be implemented by any one of hardware and computer software, or a combination thereof. The distribution of the functional blocks is not limited to the examples described above. For example, some functions may be executed by functional blocks different from the functional blocks described above. Further, the functional blocks described above may be subdivided into finer functional sub-blocks.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system comprising:
    a nonvolatile memory including a plurality of blocks; and
    a memory controller configured to:
        set each of the blocks to be in one of a plurality of states, including a first state at which writing and reading are enabled, a second state at which writing is disabled and reading is enabled, a third state at which stored data is invalidated, and a fourth state which is an erased-state;
        detect a predetermined condition related to at least one of an amount of data being written into blocks in the first state and state transition of a block;
        upon detection of the predetermined condition, determine a maximum number of blocks to be in the fourth state based on a length of time during which each block in the fourth state has been in the fourth state; and
        perform an erase operation to cause one or more blocks in the third state to transition to the fourth state when a current number of blocks in the fourth state is less than the maximum number.

2. The memory system according to claim 1, wherein the predetermined condition includes a first condition that the amount of data being written into blocks in the first state exceeds a predetermined threshold.

3. The memory system according to claim 1, wherein the predetermined condition includes a second condition that a block in the first state transitions to the second state.

4. The memory system according to claim 1, wherein the predetermined condition includes a third condition that a block in the second state transitions to the third state.

5. The memory system according to claim 1, wherein the memory controller determines the maximum number of blocks to be in the fourth state based on comparison of the length of time during which each block in the fourth state is staying in the fourth state with a threshold time period.

6. The memory system according to claim 5, wherein the threshold time period varies among the blocks depending on a number of times writing or erasing has been carried out on each block.

7. The memory system according to claim 1, wherein the memory controller includes a counter that indicates a number of blocks that have transitioned from the third state to the fourth state, and resets the counter after performing the erase operation.

8. The memory system according to claim 1, wherein the memory controller is further configured to select one or more blocks in the third state to be subjected to the erase operation based on a number of times writing or erasing has been carried out thereon and perform the erase operation with respect to the selected one or more blocks.

9. The memory system according to claim 1, wherein the memory controller carries out the erase operation with respect to two or more blocks in the third state in parallel.

10. The memory system according to claim 1, wherein the memory controller is further configured to determine a number of blocks to be subjected to the erase operation based on a difference between the maximum number of blocks and the current number of blocks in the fourth state, a current number of blocks in the third state, and a maximum number of blocks that are concurrently erasable, and perform the erase operation with respect to one or more blocks in the third state of the determined number.

11. The memory system according to claim 10, wherein the memory controller determines the least of the difference, the current number of blocks in the third state, and the maximum number of blocks that are concurrently erasable to be the number of blocks to be subjected to the erase operation.

12. The memory system according to claim 1, wherein the nonvolatile memory includes a plurality of memory chips in which the plurality of blocks are provided, each of the memory chips including:
   a first signal line connected to word lines of a first group of blocks;
   a second signal line connected to word lines of a second group of blocks; and
   a driver configured to apply a first voltage to the first signal line and a second voltage different from the first voltage to the second signal line.

13. The memory system according to claim 1, wherein
   the plurality of blocks are grouped into a plurality of groups each of which includes multiple blocks, and
   the memory controller is further configured to select one of the plurality of groups based on an average number of times writing or erasing has been carried out with respect to blocks in each group, and performs the erase operation with respect to blocks in the third state in the selected group.

14. The memory system according to claim 13, wherein the memory controller selects a group with the least average number of times writing or erasing has been carried out as the one of the plurality of groups.

15. The memory system according to claim 1, wherein
   the plurality of blocks are grouped into a plurality of groups each of which includes multiple blocks, and
   the memory controller is further configured to select one of the plurality of groups based on a number of blocks in the third state in each group.

16. The memory system according to claim 1, wherein the maximum number of blocks to be in the fourth state is determined based on comparison of the length of time during which each block in the fourth state is staying in the fourth state with a threshold time period.

17. A method of managing a nonvolatile memory including a plurality of blocks, the method comprising:
   setting each of the blocks to be in one of a plurality of states, including a first state at which writing and reading are enabled, a second state at which writing is disabled and reading is enabled, a third state at which stored data is invalidated, and a fourth state which is an erased-state;
   detecting a predetermined condition related to at least one of an amount of data being written into blocks in the first state and state transition of a block;
   upon detecting the predetermined condition, determine a maximum number of blocks to be in the fourth state based on a length of time during which each block in the fourth state has been in the fourth state; and
   performing an erase operation to cause one or more blocks in the third state to transition to the fourth state when a current number of blocks in the fourth state is less than the maximum number.

18. The method according to claim 17, wherein the predetermined condition includes a first condition that the amount of data being written into blocks in the first state exceeds a predetermined threshold.

19. The method according to claim 17, wherein the predetermined condition includes a second condition that a block in the first state transitions to the second state.

20. The method according to claim 17, wherein the predetermined condition includes a third condition that a block in the second state transitions to the third state.

* * * * *